US007042396B2

(12) United States Patent
Omura et al.

(10) Patent No.: US 7,042,396 B2
(45) **Date of Patent: *May 9, 2006**

(54) POSITION LOCATION USING DIGITAL AUDIO BROADCAST SIGNALS

(75) Inventors: Jimmy K. Omura, San Francisco, CA (US); James J. Spilker, Jr., Woodside, CA (US)

(73) Assignee: Rosom Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/741,431

(22) Filed: Dec. 18, 2003

(65) Prior Publication Data

US 2005/0015162 A1 Jan. 20, 2005

Related U.S. Application Data

(63) Continuation-in-part of application No. 10/397,068, filed on Mar. 24, 2003, and a continuation-in-part of application No. 10/353,669, filed on Jan. 28, 2003, and a continuation-in-part of application No. 10/290,984, filed on Nov. 8, 2002, and a continuation-in-part of application No. 10/232,142, filed on Aug. 29, 2002, now Pat. No. 6,717,547, and a continuation-in-part of application No. 10/210,847, filed on Jul. 31, 2002, now Pat. No. 6,861,984, and a continuation-in-part of application No. 10/209,578, filed on Jul. 31, 2002, now Pat. No. 6,753,812, which is a continuation of application No. 10/159,831, filed on May 31, 2002, now Pat. No. 6,522,297, which is a continuation of application No. 10/054,302, filed on Jan. 22, 2002, now Pat. No. 6,559,800, and a continuation-in-part of application No. 09/932,010, filed on Aug. 17, 2001.

(60) Provisional application No. 60/434,872, filed on Dec. 18, 2002.

(51) Int. Cl.
*G01S 3/02* (2006.01)

(52) U.S. Cl. ................................ 342/464; 342/357.06

(58) Field of Classification Search ................ 342/457, 342/458, 463, 357.01, 357.06, 464
See application file for complete search history.

(56) References Cited

U.S. PATENT DOCUMENTS 4,555,707 A 11/1985 Connelly
4,652,884 A 3/1987 Starker (Continued)

FOREIGN PATENT DOCUMENTS

GB 2 222 922 A 3/1990

(Continued)

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255-274.

(Continued)

*Primary Examiner*—Dao Phan
(74) *Attorney, Agent, or Firm*—Richard A. Dunning, Jr.

(57) ABSTRACT

A method, apparatus, and computer-readable media for determining the position of a user terminal comprises receiving, at the user terminal, a digital audio broadcast signal; and determining a pseudo-range between the user terminal and a transmitter of the digital audio broadcast signal based on a known component of the digital audio broadcast signal; wherein the position of the user terminal is determined based on the pseudo-range between the user terminal and the transmitter of the digital audio broadcast signal and a location of the transmitter of the digital audio broadcast signal.

24 Claims, 15 Drawing Sheets

1400

Receive a plurality of digital audio broadcast signals at the user terminal. (1402)

Determine a pseudorange between the user terminal and the transmitter of each of the digital audio broadcast signals. (1404)

Determine a position of the user terminal based on the pseudoranges and a location of each of the transmitters. (1406)

U.S. PATENT DOCUMENTS

| | | | | |
|---|---|---|---|---|
| 4,894,662 | A | 1/1990 | Counselman | |
| 5,045,861 | A | 9/1991 | Duffett-Smith | |
| 5,157,686 | A | 10/1992 | Omura et al. | |
| 5,166,952 | A | 11/1992 | Omura et al. | |
| 5,271,034 | A * | 12/1993 | Abaunza | 375/150 |
| 5,323,322 | A | 6/1994 | Mueller et al. | |
| 5,398,034 | A | 3/1995 | Spilker, Jr. | |
| 5,481,316 | A | 1/1996 | Patel | |
| 5,504,492 | A | 4/1996 | Class et al. | |
| 5,510,801 | A | 4/1996 | Engelbrecht et al. | |
| 5,604,765 | A | 2/1997 | Bruno et al. | |
| 5,648,982 | A | 7/1997 | Durrant et al. | |
| 5,774,829 | A | 6/1998 | Cisneros et al. | |
| 5,920,284 | A | 7/1999 | Victor | |
| 5,952,958 | A | 9/1999 | Speasl et al. | |
| 5,953,311 | A | 9/1999 | Davies et al. | |
| 6,016,119 | A | 1/2000 | Krasner | |
| 6,078,284 | A | 6/2000 | Levanon | |
| 6,094,168 | A | 7/2000 | Duffett-Smith et al. | |
| 6,107,959 | A | 8/2000 | Levanon | |
| 6,137,441 | A | 10/2000 | Dai et al. | |
| 6,215,778 | B1 | 4/2001 | Lomp et al. | |
| 6,317,452 | B1 | 11/2001 | Durrant et al. | |
| 6,317,500 | B1 | 11/2001 | Murphy | |
| 6,373,432 | B1 | 4/2002 | Rabinowitz et al. | |
| 6,374,177 | B1 | 4/2002 | Lee et al. | |
| 6,433,740 | B1 | 8/2002 | Gilhousen | |
| 6,590,529 | B1 | 7/2003 | Schwoegler | |
| 2003/0122711 | A1 | 7/2003 | Panasik et al. | |
| 2003/0156063 | A1 * | 8/2003 | Spilker et al. | 342/464 |

FOREIGN PATENT DOCUMENTS

| | | |
|---|---|---|
| GB | 2 254 508 A | 10/1992 |

OTHER PUBLICATIONS

Rabinowitz, M., “A Differential Carrier Phase Navigation System Combining GPS with Low Earth Orbit Satellites for Rapid Resolution of Integer Cycle Ambiguities,” *PhD Thesis for Department of Electrical Engineering , Stanford University* (Dec. 2000), pp. 59-73.

Spilker, Jr., J.J., “Fundamentals of Signal Tracking Theory,” *Global Positioning System: Theory and Applications* (1994), vol. 1, Chapter 7, pp. 245-327.

Van Dierendock, A.J., “GPS Receivers,” *Global Positioning System: Theory and Applications* (1995), vol. 1, Chapter 8, pp. 329-407.

Li, X., et al., “Indoor Geolocation Using OFDM Signals in HIPERLAN/2 Wireless LANS,” 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep..18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., “Positioning Using the ATSC Digital Television Signal,” Rosum whitepaper, Online! 2001, XP002235053, Retrieved from the Internet on Mar. 13, 2003 at URL www.rosum.com/whitepaper 8-7-01.pdf.

EP Abstract/Zusammenfassung/Abrege, 02102666.1.

JP Abstract/ vol. 007, No. 241 (P-232), Oct. 26, 1983 & JP58 129277 A (Nihon Musen KK) Aug. 2, 1983.

* cited by examiner

POSITION LOCATION USING DIGITAL AUDIO BROADCAST SIGNALS

CROSS-REFERENCE TO RELATED APPLICATIONS

This application claims the benefit of U.S. Provisional Patent Application Ser. No. 60/434,872, "Aiding Rosum's Position Location System With Digital Audio Broadcast Signals," by Jimmy K. Omura, filed Dec. 18, 2002, the disclosure thereof incorporated herein by reference in its entirety.

This application is a continuation-in-part (CIP) of U.S. patent application Ser. No. 10/210,847, "Position Location Using Broadcast Digital Television Signals" by James J. Spilker, Jr. and Matthew Rabinowitz, filed Jul. 31, 2002 now U.S. Pat No. 6,861,984; and is a CIP of U.S. patent application Ser. No. 09/932,010, "Position Location using Terrestrial Digital Video Broadcast Television Signals" by Matthew Rabinowitz and James J. Spilker, Jr., filed Aug. 17, 2001; and is a CIP of U.S. patent application Ser. No. 10/209,578, "Time-Gated Noncoherent Delay Lock Loop Tracking of Digital Television Signals," by James J. Spilker and Matthew Rabinowitz, filed Jul. 31, 2002 now U.S. Pat. No. 6,753,812; and is a CIP of U.S. patent application Ser. No. 10/159,478, "Position Location using Global Positioning Signals Augmented by Broadcast Television Signals," by Matthew Rabinowitz and James J. Spilker, filed May 31, 2002, and is a CIP of U.S. patent application Ser. No. 10/397,068, "Position Location using Global Positioning Signals Augmented by Broadcast Television Signals," by Matthew Rabinowitz and James J. Spilker, filed Mar. 24, 2003, which is a continuation (CONT) of U.S. patent application Ser. No. 10/054,302, "Position Location using Broadcast Analog Television Signals," by James J. Spilker and Matthew Rabinowitz, filed Jan. 22, 2002, now U.S. Pat. No. 6,559,800 issued May 6, 2003; and is a CIP of U.S. patent application Ser. No. 10/353,669, "Position Location Using Ghost Canceling Reference Television Signals," by James J. Spilker and Matthew Rabinowitz, filed Jan. 28, 2003, which is a CONT of Ser. No. 10/159,831, "Position Location Using Ghost Canceling Reference Television Signals," by James J. Spilker and Matthew Rabinowitz, filed May 31, 2002, now U.S. Pat. No. 6,522,297 issued Feb. 18, 2003; and is a CIP of U.S. patent application Ser. No. 10/290,984, "Wireless Position Location Using the Japanese ISDB-T Digital TV Signals," by James J. Spilker, filed Nov. 8, 2002; and is a CIP of U.S. patent application Ser. No. 10/232,142, "Position Location using Broadcast Television Signals and Mobile Telephone Signals," by James J. Spilker, Jimmy K. Omura and Matthew Rabinowitz, filed Aug. 29, 2002 now U.S. Pat. No. 6,717,547.

The subject matter of all of the foregoing are incorporated herein by reference.

BACKGROUND

The present invention relates generally to position determination, and particularly to position determination using digital television (DTV) signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features a method, apparatus, and computer-readable media for determining the position of a user terminal. It comprises receiving, at the user terminal, a digital audio broadcast signal; and determining a pseudo-range between the user terminal and a transmitter of the digital audio broadcast signal based on a known component of the digital audio broadcast signal; wherein the position of the user terminal is determined based on the pseudo-range between the user terminal and the transmitter of the digital audio broadcast signal and a location of the transmitter of the digital audio broadcast signal.

Particular implementations can include one or more of the following features. Implementations comprise determining the position of the user terminal based on the pseudo-range between the user terminal and the transmitter of the digital audio broadcast signal and a location of the transmitter of the digital audio broadcast signal. The digital audio broadcast signal is selected from the group consisting of a European Telecommunications Standards Institute (ETSI) Digital Audio Broadcast (DAB) signal; and an In-Band On-Channel (IBOC) audio broadcast signal. The known component of the digital audio broadcast signal is selected from the group consisting of a synchronization symbol; a null symbol in a synchronization channel; and a phase reference symbol in a synchronization channel. Implementations comprise receiving, at the user terminal, a broadcast signal; and determining a pseudo-range between the user terminal and a transmitter of the broadcast signal based on a known component of the broadcast signal; wherein the position of the user terminal is determined based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal. The broadcast signal is selected from the group consisting of a broadcast television signal; a mobile telephone cell site broadcast signal; and a Global Positioning System signal. The broadcast television signal is selected from the group consisting of an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. The mobile telephone cell site broadcast signal is selected from the group consisting of a Global System for Mobile Communications (GSM) signal; a Code-Division Multiple Access (cdmaOne) signal; a WCDMA signal; a cdma2000 signal; and a EDGE signal. Implementations comprise determining the position of the user terminal based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal.

In general, in one aspect, the invention features a method, apparatus, and computer-readable media for determining the position of a user terminal. It comprises receiving a pseudo-range determined between the user terminal and a transmitter of a digital audio broadcast signal based on a known component in the digital audio broadcast signal; and determining the position of the user terminal based on the pseudo-range determined between the user terminal and the transmitter of the digital audio broadcast signal and a location of the transmitter of the digital audio broadcast signal.

Particular implementations can include one or more of the following features. The digital audio broadcast signal is selected from the group consisting of a European Telecommunications Standards Institute (ETSI) Digital Audio Broadcast (DAB) signal; and an In-Band On-Channel (IBOC) audio broadcast signal. The known component of the digital audio broadcast signal is selected from the group consisting of a synchronization symbol; a null symbol in a synchronization channel; and a phase reference symbol in a synchronization channel. Implementations comprise receiving a pseudo-range determined between the user terminal and a transmitter of a broadcast signal based on a known component in the broadcast signal; and determining the position of the user terminal based on the pseudo-range determined between the user terminal and the transmitter of the digital audio broadcast signal, the pseudo-range determined between the user terminal and the transmitter of the broadcast signal, a location of the transmitter of the digital audio broadcast signal, and a location of the transmitter of the broadcast signal. The broadcast signal is selected from the group consisting of a broadcast television signal; a mobile telephone cell site broadcast signal; and a Global Positioning System signal. The broadcast television signal is selected from the group consisting of an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. The mobile telephone cell site broadcast signal is selected from the group consisting of a Global System for Mobile Communications (GSM) signal; a Code-Division Multiple Access (cdmaOne) signal; a WCDMA signal; a cdma2000 signal; and a EDGE signal.

Advantages that can be seen in implementations of the invention include one or more of the following. Implementations of the invention may be used to position cellular telephones, wireless PDA's (personal digital assistant), pagers, cars, OCDMA (orthogonal code-division multiple access) transmitters and a host of other devices. Implementations of the inventions make use of a DTV signal which has excellent coverage. Implementations of the present invention require no changes to the Digital Broadcast Stations.

The DTV signal has a power advantage over GPS of more than 50 dB, and substantially superior geometry to that which a satellite system could provide, thereby permitting position location even in the presence of blockage and indoors. The DTV signal has roughly eight times the bandwidth of GPS, thereby minimizing the effects of multipath. Due to the high power and sparse frequency components of the DTV signal used for ranging, the processing requirements are minimal. Implementations of the present invention accommodate far cheaper, lower-speed, and lower-power devices than a GPS technique would require.

In contrast to satellite systems such as GPS, the range between the DTV transmitters and the user terminals changes very slowly. Therefore the DTV signal is not significantly affected by Doppler effects. This permits the signal to be integrated for a long period of time, resulting in very efficient signal acquisition.

The frequency of the DTV signal is substantially lower that that of conventional cellular telephone systems, and so has better propagation characteristics. For example, the DTV signal experiences greater diffraction than cellular signals, and so is less affected by hills and has a larger horizon. Also, the signal has better propagation characteristics through buildings and automobiles. Further, implementations of the present invention utilize a component of the ISDB-T signal that is continuous and constitutes a large percentage of the power of the ISDB-T signal.

Unlike the terrestrial Angle-of-Arrival/Time-of-Arrival positioning systems for cellular telephones, implementations of the present invention require no change to the hardware of the cellular base station, and can achieve positioning accuracies on the order of 1 meter. When used to position cellular phones, the technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

The details of one or more embodiments of the invention are set forth in the accompanying drawings and the description below. Other features, objects, and advantages of the invention will be apparent from the description and drawings, and from the claims.

DETAILED DESCRIPTION

Introduction

Figure 1:
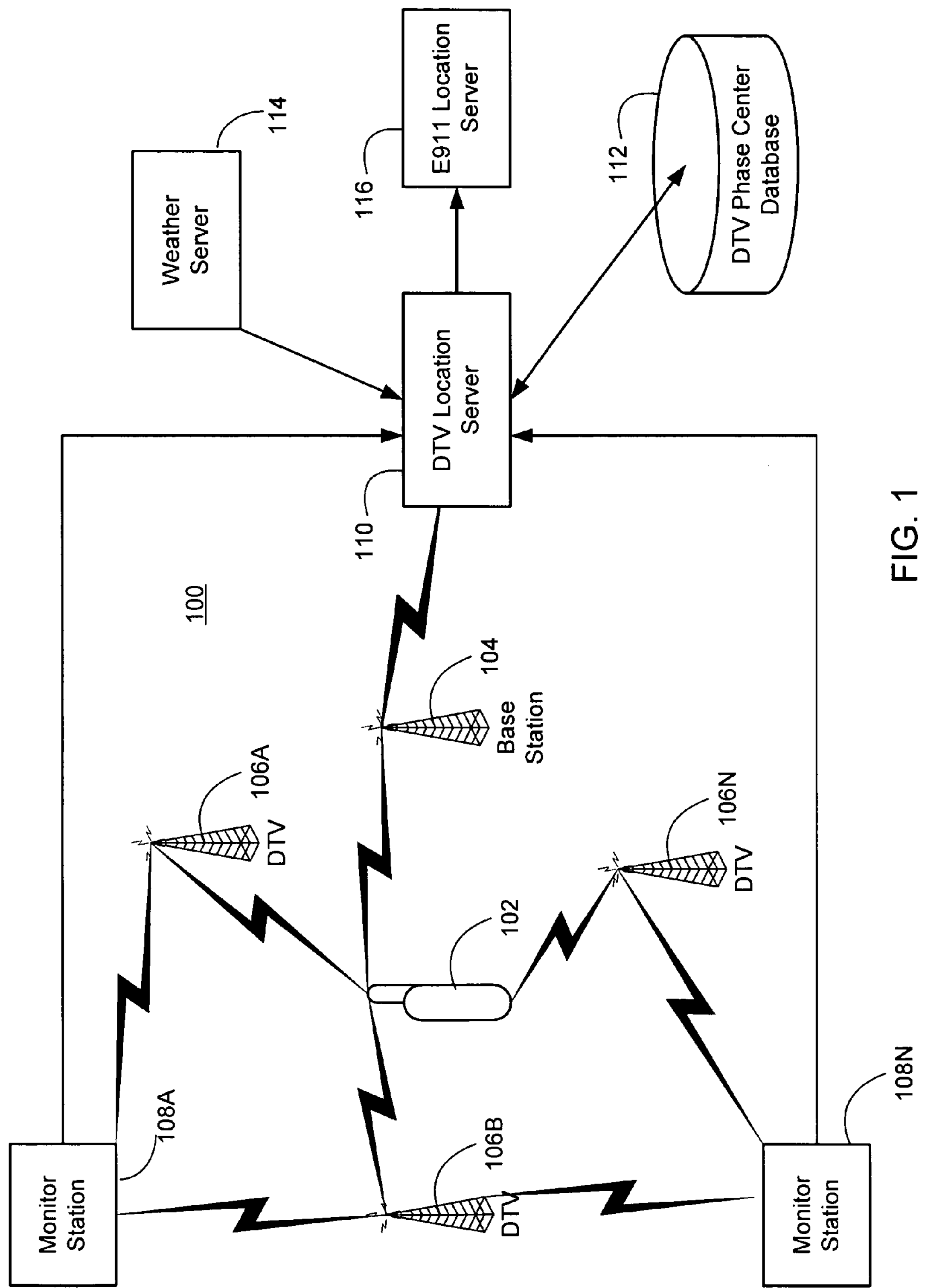
FIG. 1 depicts an implementation of the present invention using DTV broadcast signals.

Digital television (DTV) is growing in popularity. DTV was first implemented in the United States in 1998. As of the end of 2000, 167 stations were on the air broadcasting the DTV signal following the ATSC digital TV standard. As of Feb. 28 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States. Other regions are implementing similar DTV systems. The European DTV standard called Digital Video Broadcasting (DVB) is the most widely accepted in the world. The DVB terrestrial standard version is denoted DVB-T. The Japanese system is a variation of DVB. The Japan Broadcasting Corp. (NHK) has defined a terrestrial DTV signal for Japan, referred to as the Integrated Services Digital Broadcasting-Terrestrial (ISDB-T) signal. The inventors have recognized that the DTV signals can be used for position location, and have developed techniques for doing so. These techniques are usable in the vicinity of DTV transmitters with a range from the transmitter much wider than the typical TV reception range. Because of the high power of the DTV signals, these techniques can even be used indoors by handheld receivers, and thus provide a possible solution to the position location needs of the Enhanced 911 (E911) system.

In contrast to the digital pseudo-noise codes of GPS, the DTV signals are received from transmitters only a few miles distant, and the transmitters broadcast signals at effective radiated powers of up to several hundred kilowatts. In addition the DTV transmitter antennas have significant antenna gain, on the order of 14 dB. Thus there is often sufficient power to permit DTV signal reception inside buildings.

The use of the DTV signal is advantageous for several reasons. First, it permits position determination indoors, and at great distances from DTV transmitters. Conventional DTV receivers utilize only one data signal at a time, and so are limited in range from the DTV transmitter by the energy of a single signal. In contrast, implementations of the present invention utilize the energy of multiple scattered pilot signals simultaneously, thereby permitting operation at greater range from DTV transmitters than conventional DTV receivers. Further, the scattered pilots are not modulated by data. This is advantageous for two reasons. First, all of the power in the scattered pilots is available for position determination; none of the power is devoted to data. Second, the scattered pilots can be observed for long periods of time without suffering the degradation that data modulation would produce. Thus the ability to track signals indoors at substantial range from the DTV tower is greatly expanded. Furthermore, through the use of digital signal processing it is possible to implement these new tracking techniques in a single semiconductor chip.

The techniques disclosed herein can be applied to other DTV signals that include known sequences of data by simply modifying the correlator to accommodate the known sequence of data, as would be apparent to one skilled in the relevant arts. These techniques can also be applied to a range of other orthogonal frequency-division multiplexing (OFDM) signals such as satellite radio signals and digital audio broadcast signals, as described in detail below.

Television signals include components that can be used to convey timing information. Suitable components within the American Television Standards Committee (ATSC) digital television signal include synchronization codes such as the Field Synchronization Segment within an ATSC data frame and the Synchronization bits within each Data Segment in an ATSC data frame, as described in copending U.S. Non-provisional patent application Ser. No. 10/210,847, "Position Location using Broadcast Digital Television Signals," by James J. Spilker and Matthew Rabinowitz, filed Jun. 21, 2001, the disclosure thereof incorporated by reference herein in its entirety.

Suitable components within the European Telecommunications Standards Institute (ETSI) Digital Video Broadcasting-Terrestrial (DVB-T) and Integrated Services Digital Broadcasting-Terrestrial (ISDB-T) digital television signals include scattered pilot carriers, as described in copending U.S. Non-provisional patent application Ser. No. 09/932,010, "Position Location using Terrestrial Digital Video Broadcast Television Signals," by James J. Spilker and Matthew Rabinowitz, filed Aug. 17, 2001; and Ser. No. 10/290,984, "Wireless Position Location Using the Japanese ISDB-T Digital TV Signals," by James J. Spilker, filed Nov. 8, 2002; the disclosures thereof incorporated by reference herein in their entirety.

Suitable components within analog television signals, such as the National Television System Committee (NTSC), Phase Alternating Line (PAL), and Sequential Color with Memory (SECAM) signals, include the horizontal synchronization pulse, the horizontal blanking pulse, the horizontal blanking pulse and horizontal synchronization pulse taken together, the ghost canceling reference signal, the vertical interval test signal, and other chirp-type signals such as multiburst signals, as described in copending U.S. Non-provisional patent application Ser. No. 10/054,302, "Position Location using Broadcast Analog Television Signals," by James J. Spilker and Matthew Rabinowitz, filed Jan. 22, 2002; and Ser. No. 10/159,831, "Position Location Using Ghost Canceling Reference Television Signals," by James J. Spilker and Matthew Rabinowitz, filed May 31, 2002, the disclosures thereof incorporated by reference herein in their entirety.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
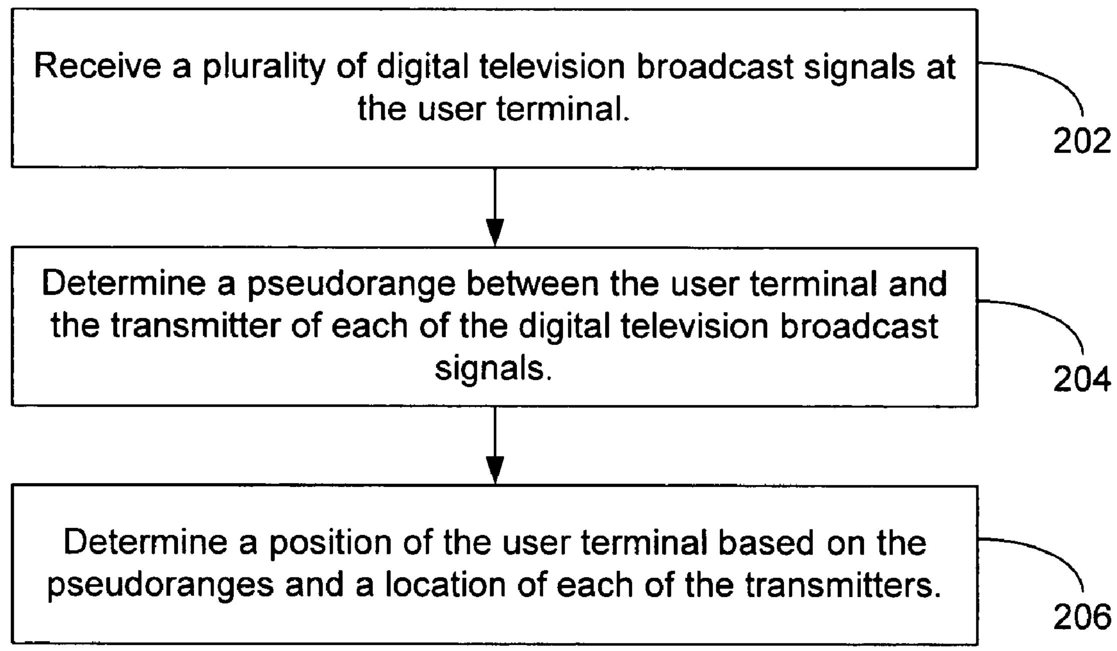
FIG. 2 illustrates an operation of an implementation of the present invention using DTV broadcast signals.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing. This selection is based on the power levels of the DTV channels, as well as the directions from which each of the signals are arriving, so as to minimize the dilution of precision (DOP) for the position calculation.

User terminal 102 determines a pseudo-range between the user terminal 102 and each DTV transmitter 106 (step 204). Each pseudo-range represents the time difference (or equivalent distance) between a time of transmission from a transmitter 106 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset}=a+b(t-T)+c(t-T)^2 \tag{1}$$

that can be described by a, b, c, and T. In either implementation, each measured time offset is transmitted periodically to the DTV location server using the Internet, a secured modem connection, as part of the actual DTV broadcast data, or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. One approach to doing this is to use multiple time-synchronized monitor units at known locations. These units make pseudo-range measurements to a TV transmitter at the same time instant, and those measurements can be used to inverse-triangulate the location of the TV transmitter phase centers. In another implementation, the phase center of each DTV transmitter 106 is measured by surveying the antenna phase center. Once determined, the phase centers are stored in a data base 112.

In one implementation, DTV location server 110 receives weather information describing the air temperature, atmospheric pressure, and humidity in the vicinity of user terminal 102 from a weather server 114. The weather information is available from the Internet and other sources. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
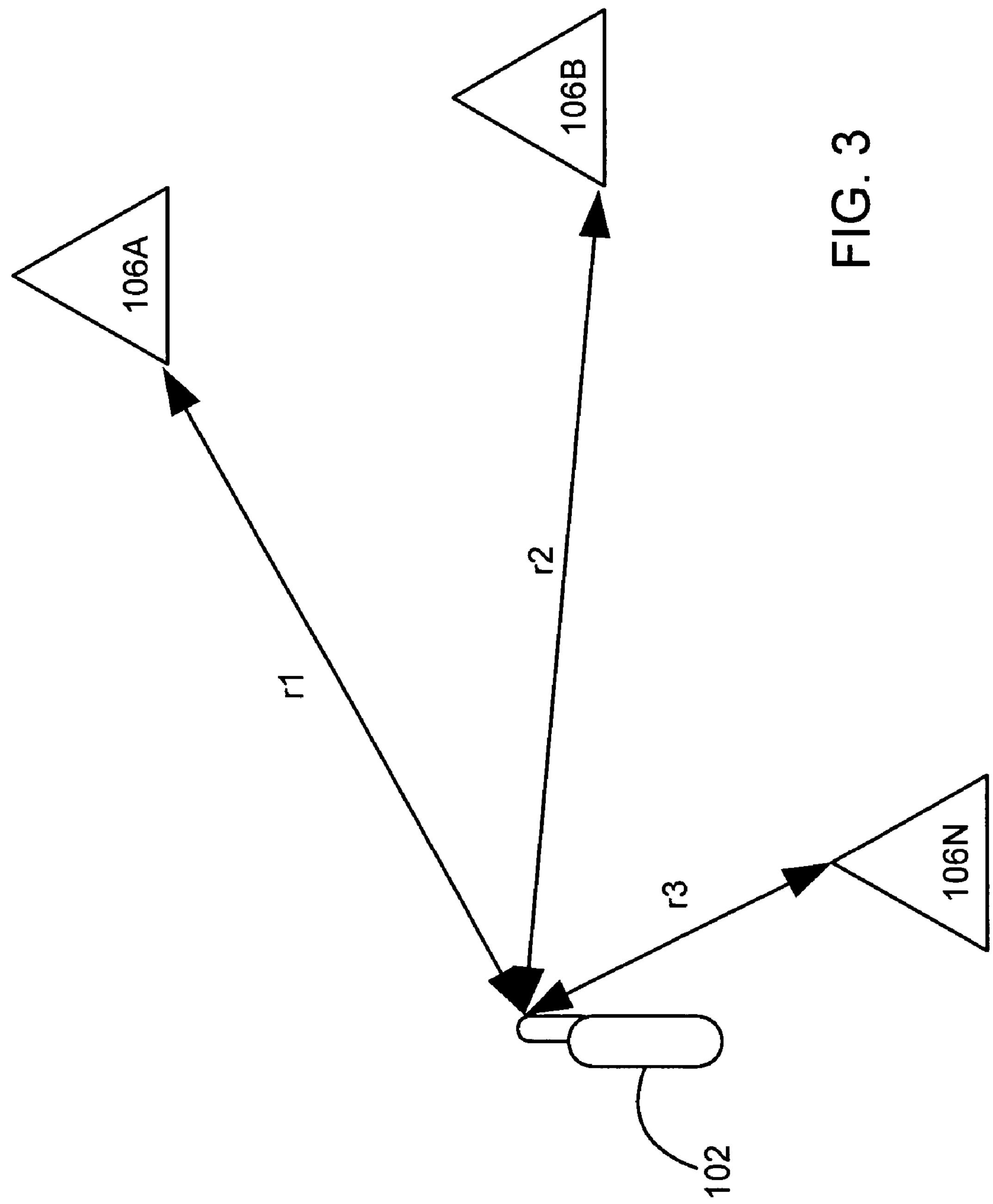
FIG. 3 depicts the geometry of a position determination using three DTV transmitters.

DTV location server 110 determines a position of the user terminal based on the pseudo-ranges and a location and clock offset of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1=r1+T \quad (2a)$$

$$pr2=r2+T \quad (3a)$$

$$pr3=r3+T \quad (4a)$$

The three ranges can be expressed as $$r1=|X-X1| \quad (5)$$

$$r2=|X-X2| \quad (6)$$

$$r3=|X-X3| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta)=T(t)+\frac{\partial T}{\partial t}\Delta \quad (8)$$

We now reconsider equations (2a)–(4a) treating the clock offset as a function of time. Consequently, the pseudo-range measurements are also a function of time. For clarity, we assume that the ranges remain essentially constant over the interval Δ. The pseudo-range measurements may be described as:

$$pr1(t1)=r1+T(t1) \quad (2b)$$

$$pr2(t2)=r2+T(t2) \quad (3b)$$

$$prN(tN)=rN+T(tN) \quad (4b)$$

In one embodiment, the user terminal 102 commences with an additional set of pseudo-range measurements at some time Δ after the initial set of measurements. These measurements may be described:

$$pr1(t1+\Delta)=r1+T(t1)+\frac{\partial T}{\partial t}\Delta \quad (2c)$$

$$pr2(t2+\Delta)=r2+T(t2)+\frac{\partial T}{\partial t}\Delta \quad (3c)$$

$$prN(tN+\Delta)=rN+T(tN)+\frac{\partial T}{\partial t}\Delta \quad (4c)$$

The user terminal 102 then projects all the pseudo-range measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0)=pr1(t1)+[pr1(t1+\Delta)-pr1(t1)](t0-t1)/\Delta \quad (2d)$$

$$pr2(t0)=pr2(t2)+[pr2(t2+\Delta)-pr2(t2)](t0-t2)/\Delta \quad (4d)$$

$$prN(t0)=prN(tN)+[prN(tN+\Delta)-prN(tN)](t0-tN)/\Delta \quad (4d)$$

These projected pseudo-range measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudo-range measurements. The state of each of these tracking loops is sampled at the same instant of time.

In another implementation, user terminal 102 does not compute pseudo-ranges, but rather takes measurements of the DTV signals that are sufficient to compute pseudo-range, such as a segment of the correlator output, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods. This assumes, of course, that the local clock is stable enough over the period of time since T was computed.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

Figure 4:
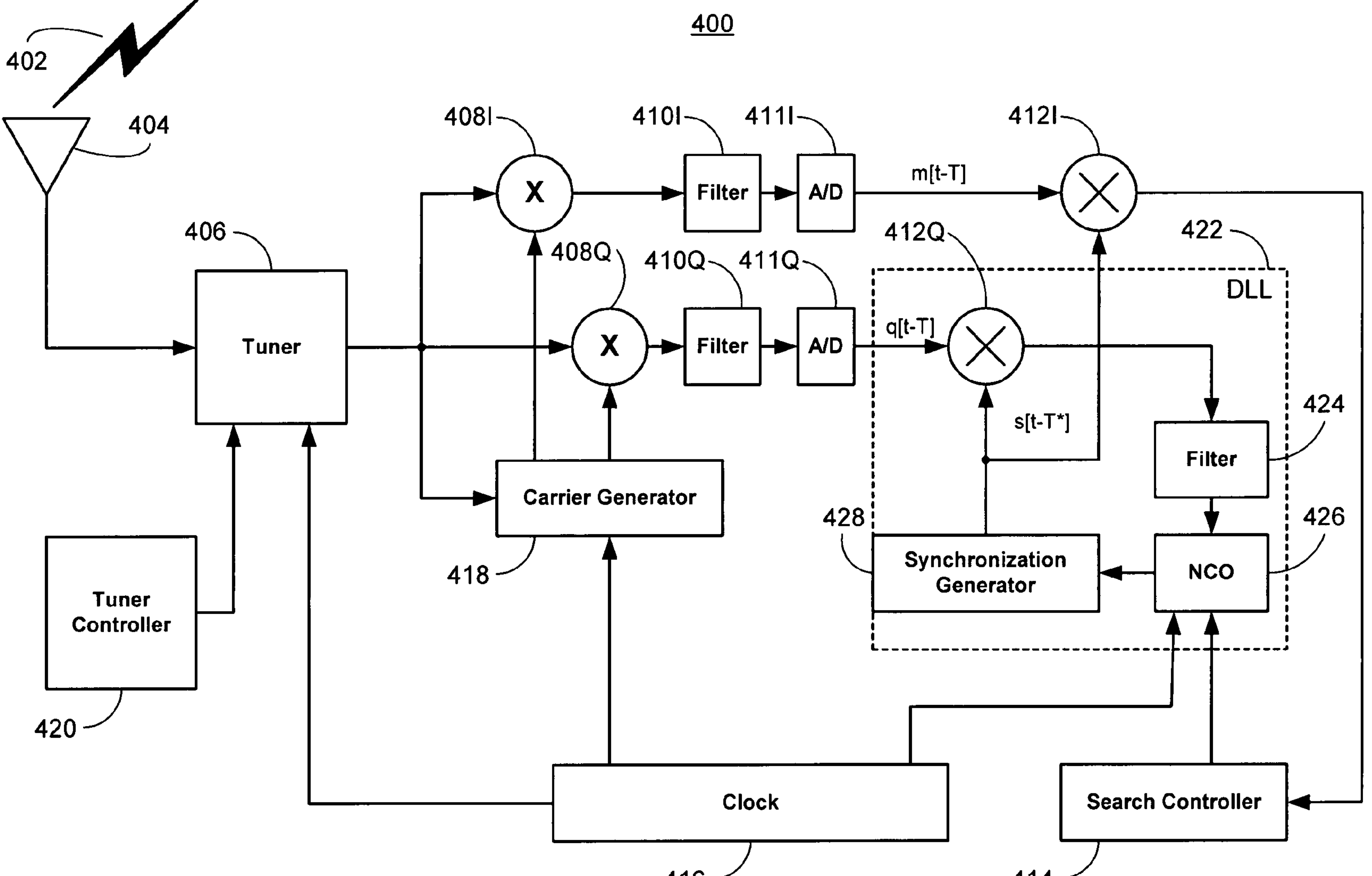
FIG. 4 depicts an implementation of a receiver for use in generating a pseudo-range measurement.

In another implementation, when only one or two DTV transmitters are available for position determination, GPS is used to augment the position determination, and each GPS satellite is treated as another transmitter in the positioning solution Receiver Architecture FIG. 4 depicts an implementation 400 of a receiver for use in generating a pseudo-range measurement. In one implementation, receiver 400 is implemented within user terminal 102. In another implementation, receiver 400 is implemented within a monitor unit 108.

Tuner 406, clocked by a clock 416, tunes antenna 404 to a DTV signal 402 in the area in response to control signals provided by tuner controller 420. In some embodiments, tuner 406 also downconverts the received DTV signal(s) to intermediate frequency (IF). Mixers 408I and 408Q combine the carrier signal produced by carrier generator 418 with the tuned DTV signal to produce in-phase and quadrature DTV signals at intermediate frequency (IF) or baseband. In one embodiment, clock 416 runs at 27 MHz. Each of these signals is filtered by one of filters 410I and 410Q, and digitized by one of analog-to-digital converters (A/D) 411I and 411Q, to produce signals $m[t-T]$ and $q[t-T]$, respectively. In alternative embodiments, a single A/D converter with a switch is used to alternately sample the in-phase and quadrature channels. A correlator 412I combines signal $m[t-T]$ with a synchronization signal $s[t-T^*]$, and provides the correlation output to a search controller 414.

A delay-lock loop 422 comprises a correlator 412Q, a filter 424, a number-controlled oscillator (NCO) 426 clocked by clock 416, and a synchronization generator 428 that generates a digital representation of the scattered pilot signals. Correlator 412Q combines signal $q[t-T]$ with synchronization signal signals $s[t-T^*]$, and provides the correlation output, after filtering by filter 424, to NCO 426. NCO 426 drives synchronization generator 428 according to search controller 414.

Control is provided by search controller 414 during signal acquisition, and by NCO 426 during signal tracking after acquisition. A pseudo-range is obtained by sampling NCO 426.

Note that the position location operation at the subscriber handset or other device need only take place when the subscriber needs position location. For a subscriber walking slowly, in a slowly moving vehicle, or sitting in a building or field in an emergency, this location information need only be measured infrequently. Thus the battery or other power source can be very small.

Of course, other versions of receiver 400 can be implemented using the concepts described above, for example by processing the received DTV signal using fast Fourier transform (FFT) methods. In addition, one can simply digitize the sum of the 9 chirp signals, or all 117 chirp carriers, and perform in a quasi-optimal manner.

Important to achieving this performance is the concept of correlating with all scattered pilots in parallel, or at least with the 9 in a single segment. Wider bandwidths of the composite signal provide greater position location accuracy. The timing accuracy is inversely proportional to the bandwidth.

Other signals within the ISDB-T structure can also be used for position location. For example, a wide laning technique could be applied to the continuous pilot signals. However, such techniques as wide laning involve inherent resolution of cycle ambiguities Techniques for resolving such ambiguities are well-known in the art.

The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

Position Location Enhancements

Figure 5:
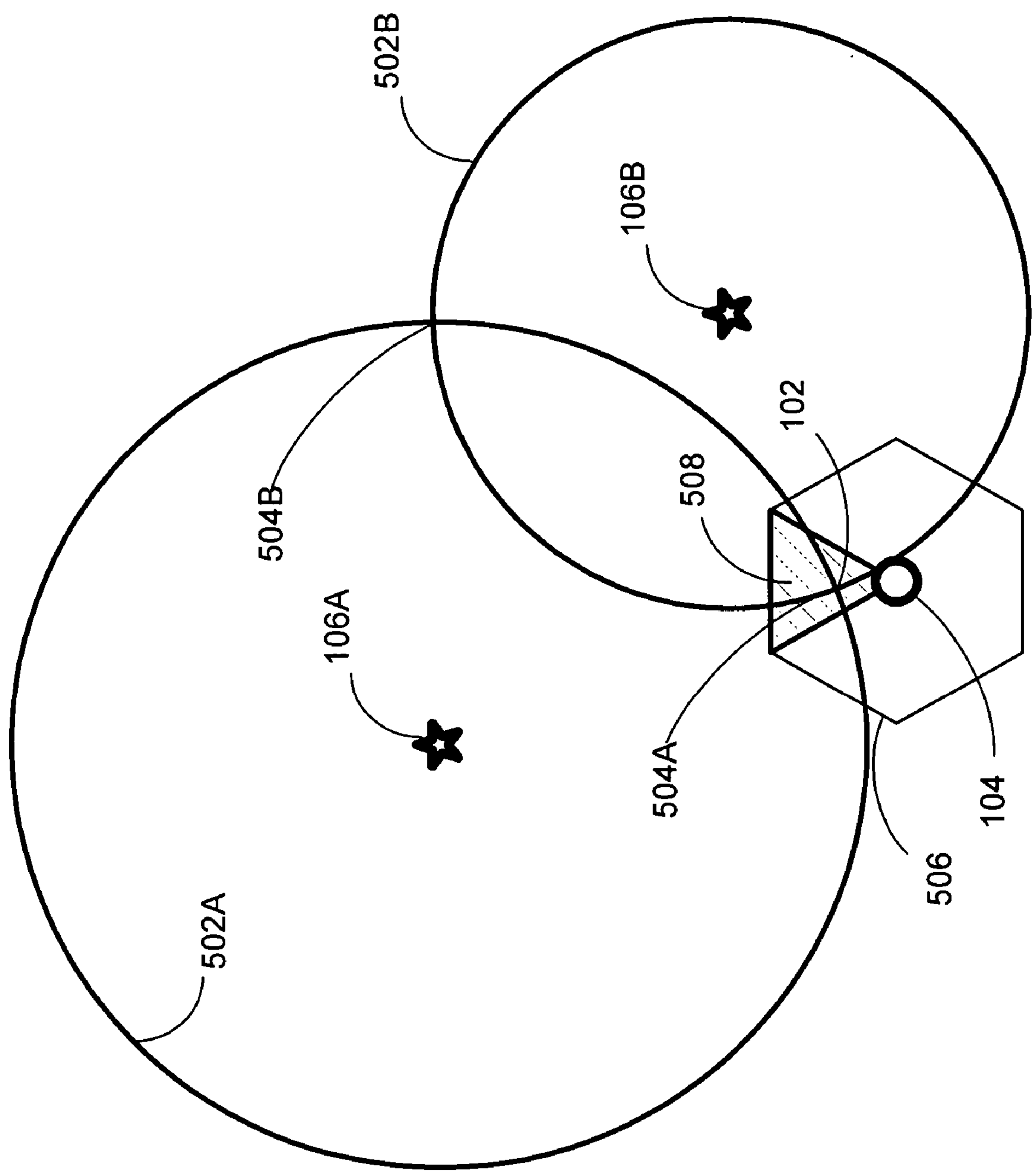
FIG. 5 describes a simplified example of a position location calculation for a mobile telephone user terminal using two DTV broadcast signals and knowledge of the cell phone base station.

The a-priori knowledge of the location of the cellular site can be used to enhance the position determination. This is conceptually illustrated in FIG. 5, which describes a simplified example of a position location calculation for a mobile telephone user terminal 102 receiving DTV signals from two separate DTV antennas 106A and 106B. For this simplified example, it is assumed that the user's clock offset is already known. Based on the range measurements, circles of constant range 502A and 502B are drawn about each of transmit antennas 106A and 106B, respectively. The position for a user terminal, including correction for the user terminal clock offset, is then at one of the intersections 504A and 504B of the two circles 502A and 502B. The ambiguity is resolved by noting that base station 104 can determine in which sector 508 of its footprint (that is, its coverage area) 506 the user terminal is located. Of course if there are more than two DTV transmitters in view, the ambiguity can be resolved by taking the intersection of three circles. Since the synchronization codes from TV transmitters are repetitive in nature, a cycle ambiguity exists, determined by the repetition period of the TV synch code, which results in a distance ambiguity equal to the repetition period times by the speed of light. This cycle ambiguity may be resolved by the same technique described for the simplified example of FIG. 5 as long as the distance ambiguity is large in comparison with the size of the cell site, which is typically the case.

In one implementation, instead of using the cell site to initially determine a rough location, user terminal 102 can accept an input from a user that gives a general indication of the area, such as the name of the nearest city. In one implementation, user terminal 102 scans available DTV channels to assemble a fingerprint of the location describing the set of visible channels. User terminal 102 compares this fingerprint to a stored table that matches known fingerprints with known locations to identify the current rough location of user terminal 102.

Figure 6:
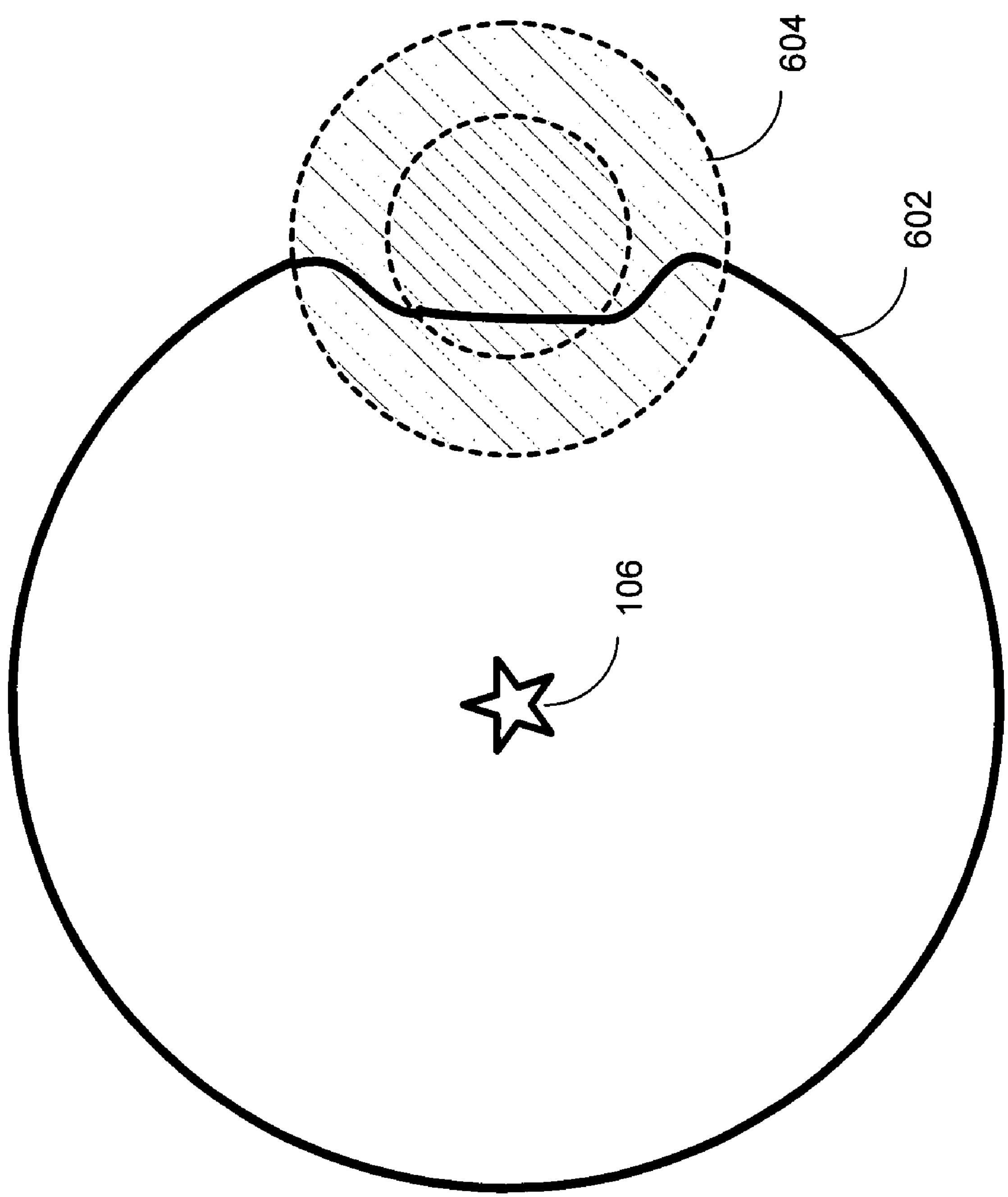
FIG. 6 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 6 depicts the effects of a single hill 604 on a circle of constant range 602 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 6.

Monitor Units

Figure 7:
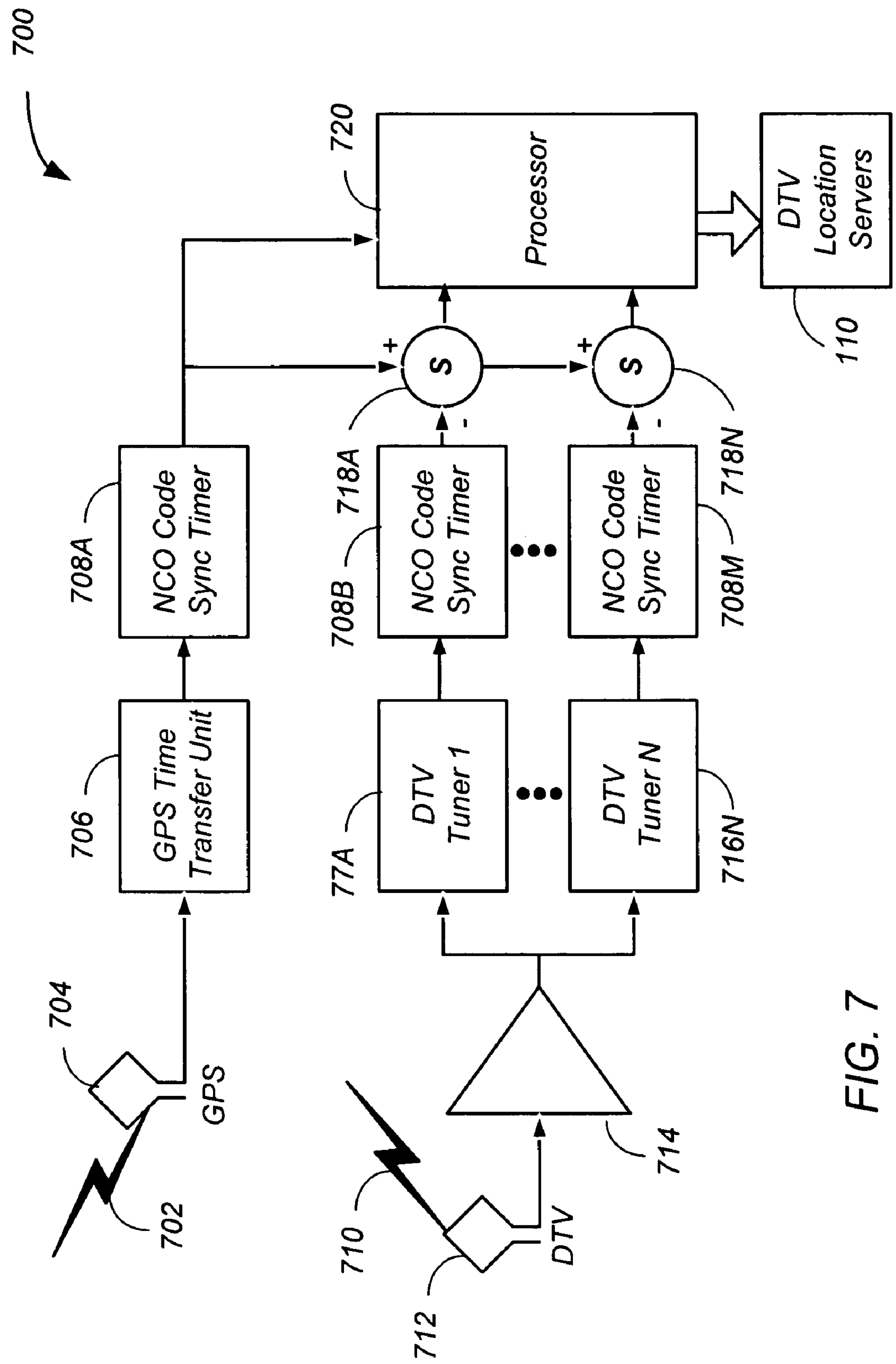
FIG. 7 depicts an implementation of a monitor unit for DTV broadcast signals.

FIG. 7 depicts an implementation 700 of monitor unit 108. An antenna 704 receives GPS signals 702. A GPS time transfer unit 706 develops a master clock signal based on the GPS signals. In order to determine the offset of the DTV transmitter clocks, a NCO (numerically controlled oscillator) code synchronization timer 708A develops a master synchronization signal based on the master clock signal. The channel synchronization signal can include the ATSC standard Segment Synchronization Bits or the Field Synchronization Segments. Alternatively it can include the DVB-T or ISDB-T scattered pilot carriers. In one implementation, the NCO synchronization timers 708A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 712 receives a plurality of DTV signals 710. In another implementation, multiple DTV antennas are used. An amplifier 714 amplifies the DTV signals. One or more DTV tuners 716A through 716N each tunes to a DTV channel in the received DTV signals to produce a DTV channel signal. Each of a plurality of NCO code synchronization timers 708B through 708M receives one of the DTV channel signals. Each of NCO code synchronization timers 708B through 708M extracts a channel synchronization signal from a DTV channel signal. The channel synchronization signal can include the ATSC standard Segment Synchronization Bits or the Field Synchronization Segments. Alternatively it can include the DVB-T and ISDB-T scattered pilot carriers. In one implementation, the continuous pilot signals and symbol timing within the DVB-T or ISDB-T signal are used as acquisition aids.

Each of a plurality of summers 718A through 718N generates a clock offset between the master synchronization signal and one of the channel synchronization signals. Processor 720 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself. The clock offsets for each channel may also be modeled as a function of time.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay a simple approach is to use a software receiver, which samples a sequence of the filtered signal, and then processes the sample in firmware on a digital signal processor.

Figure 8:
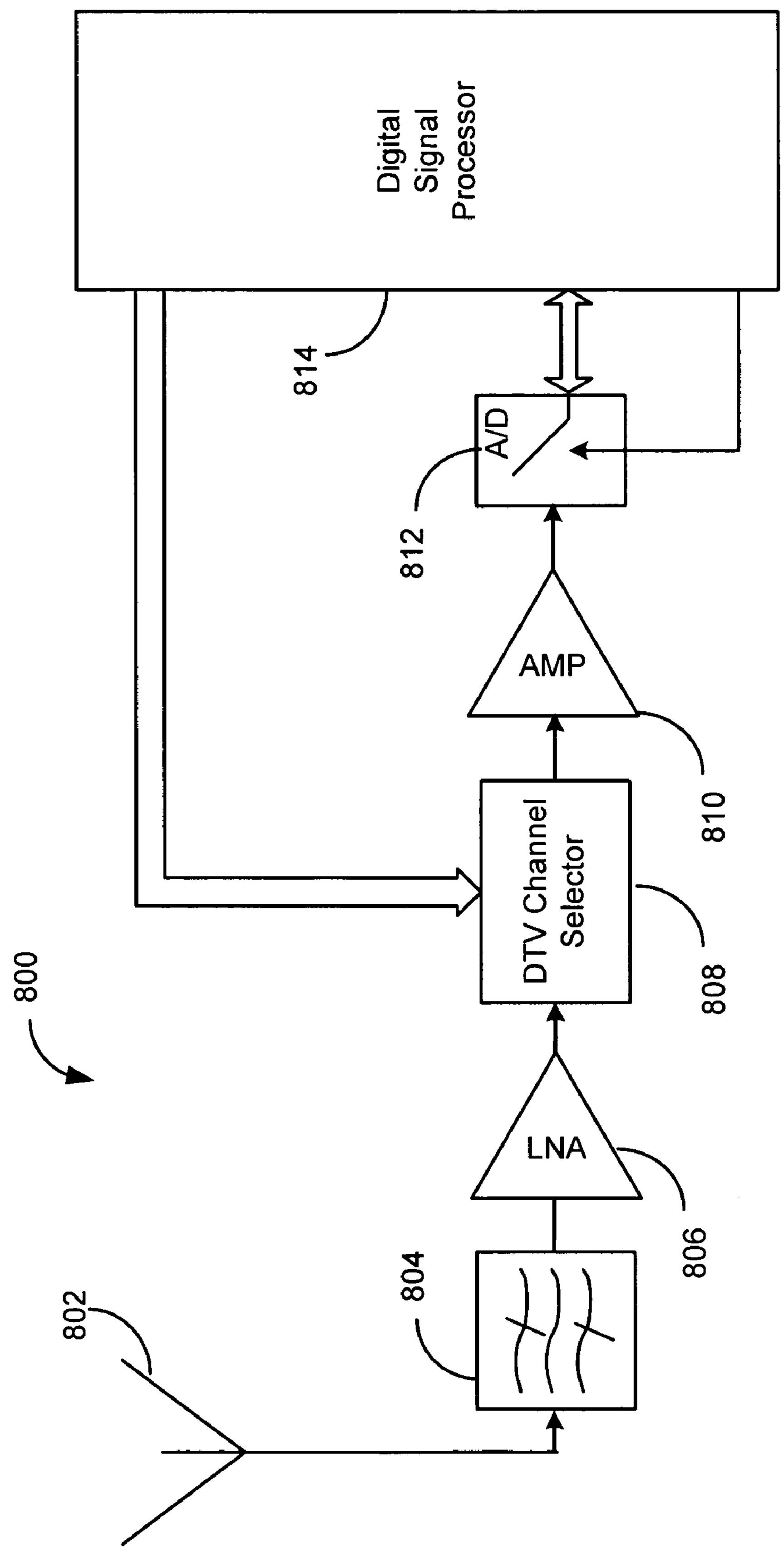
FIG. 8 illustrates one implementation for a software receiver.

FIG. 8 illustrates one implementation 800 for a software receiver. An antenna 802 receives a DTV signal. Antenna 802 can be a magnetic dipole or any other type of antenna capable of receiving DTV signals. A bandpass filter 804 passes the entire DTV signal spectrum to an LNA 806. In one implementation, filter 804 is a tunable bandpass filter that passes the spectrum for a particular DTV channel under the control of a digital signal processor (DSP) 814.

A low-noise amplifier (LNA) 806 amplifies and passes the selected signal to a DTV channel selector 808. DTV channel selector 808 selects a particular DTV channel under the control of a processor 814, and filters and downconverts the selected channel signal from UHF (ultra-high frequency) to IF (intermediate frequency) according to conventional methods. An amplifier (AMP) 810 amplifies the selected IF channel signal. This amplifier may employ automatic gain control (AGC) in order to improve the dynamic range of the architecture. An analog-to-digital converter and sampler (A/D) 812 produces digital samples of the DTV channel signal $s_{samp}(t)$ and passes these samples to DSP 814.

Now the processing of the DTV channel signal by DSP 814 is described for a non-coherent software receiver. A nominal offset frequency for the downconverted sampled signal is assumed. If this signal is downconverted to baseband, the nominal offset is 0 Hz. The process generates the complete autocorrelation function based on sampled signal $s_{samp}(t)$. There are many techniques for the process to be implemented more efficiently such as using a low duty factor reference signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$

Create a complex code signal $$s_{code}(t)=C_i(t)+jC_q(t)$$

where $C_i$ is the function describing the in-phase baseband signal and $C_q$ is the function describing the quadrature baseband signal.

Compute $F(s_{code})^*$ where F is the Fourier transform operator, and * is the conjugate operator.

For $\omega=\omega_{in}-\omega_{offset}$ to $\omega_{in}+\omega_{offset}$ step $$\frac{\pi}{2T_i}$$

Create a complex mixing signal $$s_{mix}(t)=\cos(\omega t)+j\sin(\omega t),\ t=[0\ \ldots\ T_i]$$

Combine the incident signal s(t) and the mixing signal $s_{mix}(t)$ $$s_{comb}(t)=s_{samp}(t)s_{mix}(t)$$

Compute the correlation function $$R(\tau=F^{-1}\{F(s_{code})^*F(s_{comb})\}$$

If $\max_\tau|R(\tau)|>R_{max}$, $R_{max}\leftarrow\max_\tau|R(\tau)|R_{store}(\tau)=R(\tau)$ Next $\omega$ Upon exit from the process, $R_{store}(\tau)$ will store the correlation between the incident sampled signal $s_{samp}(t)$ and the complex code signal $S_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

Position Location Using Digital Audio Broadcast Signals

Any digital broadcast signal comprises known signal components that allow a receiver to synchronize to the parameters of the transmitted signal. Typically this allows a receiver to estimate frequency and time parameters of the transmitted signal where encoded (error correction coding and interleaving) data packets are transmitted in some frame structure. Such known signal components of the broadcast signal can be used to create a reference waveform at the receiver. This reference waveform can be used to compute a pseudo range between the receiver and the broadcast station by cross correlation of this reference waveform with the received broadcast signal. All of the signals described above, including analog TV signals, have fixed known elements in their transmitted signals that can be used to create reference waveforms. Any such reference waveform can be used at user terminal 102 to cross correlate with a corresponding received signal to compute a pseudo range between the location of user terminal 102 and the transmitter location.

In particular, digital audio broadcast signals which have such known signal components are used to create a reference waveform allowing the computing of pseudo ranges for position location systems according to embodiments of the present invention. The pseudoranges obtained from digital audio broadcast signals can be used alone or in conjunction with pseudoranges obtained from other signals, such as the broadcast television signals described above, to determine the position of user terminal 102.

Orthogonal Frequency Division Multiplexing (OFDM) signals are being used for satellite and terrestrial digital audio broadcast and for terrestrial broadcast of digital television. An OFDM signal consists of a sum of subcarriers that are modulated by using Phase Shift Keying (PSK) or Quadrature Amplitude Modulation (QAM). The modulation interval of each of these subcarriers is typically much longer than the symbol time for a conventional single carrier signal of the same total bandwidth. This modulation interval for each subcarrier is called the symbol time for the OFDM signal. Thus the symbol time for an OFDM signal is approximately N times the symbol time of a single carrier signal of the same bandwidth where N is the number of subcarriers in the OFDM signal.

This long symbol time, in fact, is the key advantage of OFDM against multipath. The number of carriers which determine the symbol time interval, for a given total signal bandwidth, are selected so that the broadcast channel multipath delays are some fraction of this symbol time interval. Longer symbol times, however, place a more stringent frequency stability requirement on OFDM systems compared to a single carrier system such as the ATSC digital television standard for the United States.

In addition to the useful symbol time, TU, there is an additional guard time, TG. Thus the total time TS for a single OFDM symbol is given by TS=TU+TG. In a typical broadcast channel all the multipath delays are within the guard time TG. The ratio of guard time to useful symbol time can be one of several values. With the European terrestrial DVB digital television standard, for example, the values are TG/TU=1/4, 1/8, 1/16, and 1/32. Here the useful symbol time, TU, is also the sample duration for the DFT computation for each symbol in the receivers for these OFDM signals.

To eliminate intersymbol interference due to multipath delays, the guard time TG is chosen to be larger than the expected delay spread. The guard time could consist of no signal at all. However, then the carriers would no longer be orthogonal over any delayed TU interval. Here the OFDM signal is cyclically extended in the guard time. This insures that even if the DFT interval (useful symbol time TU) is delayed, there is an even number of cycles within the DFT interval, assuming this delay is less than the guard time. A conventional timing and frequency synchronization technique is described in R. Van Nee and R. Prasad, "OFDM For Wireless Multimedia Communications," Artech House Publishers, 2000.

Position Location Using the ETSI DAB Signal

Digital Audio Broadcasting (DAB) is a standard, established in 1995 by the European Telecommunications Standards Institute (ETSI), to be the digital successor to current analog audio broadcasting based on AM and FM. DAB was the first standard to use OFDM. One important reason to use OFDM for DAB is the possibility to use a single frequency network, which greatly enhances spectrum efficiency. In such a single frequency network two or more transmitters may be sending the same signal, with different delays, to a receiver. With OFDM, receivers can more easily handle this "apparent multipath" created by these transmitters.

In order to allow the DAB system to be used in different transmission network configurations and over a wide range of operating frequencies, four transmission modes are defined as shown in Table 1.

TABLE 1

| Transmission Modes | Duration of Transmission Frame | Number of FIBs per Transmission Frame | Number of CIFs per Transmission Frame |
|---|---|---|---|
| I | 96 ms | 12 | 4 |
| II | 24 ms | 3 | 1 |
| III | 24 ms | 4 | 1 |
| IV | 48 ms | 6 | 4 |

Figure 9:
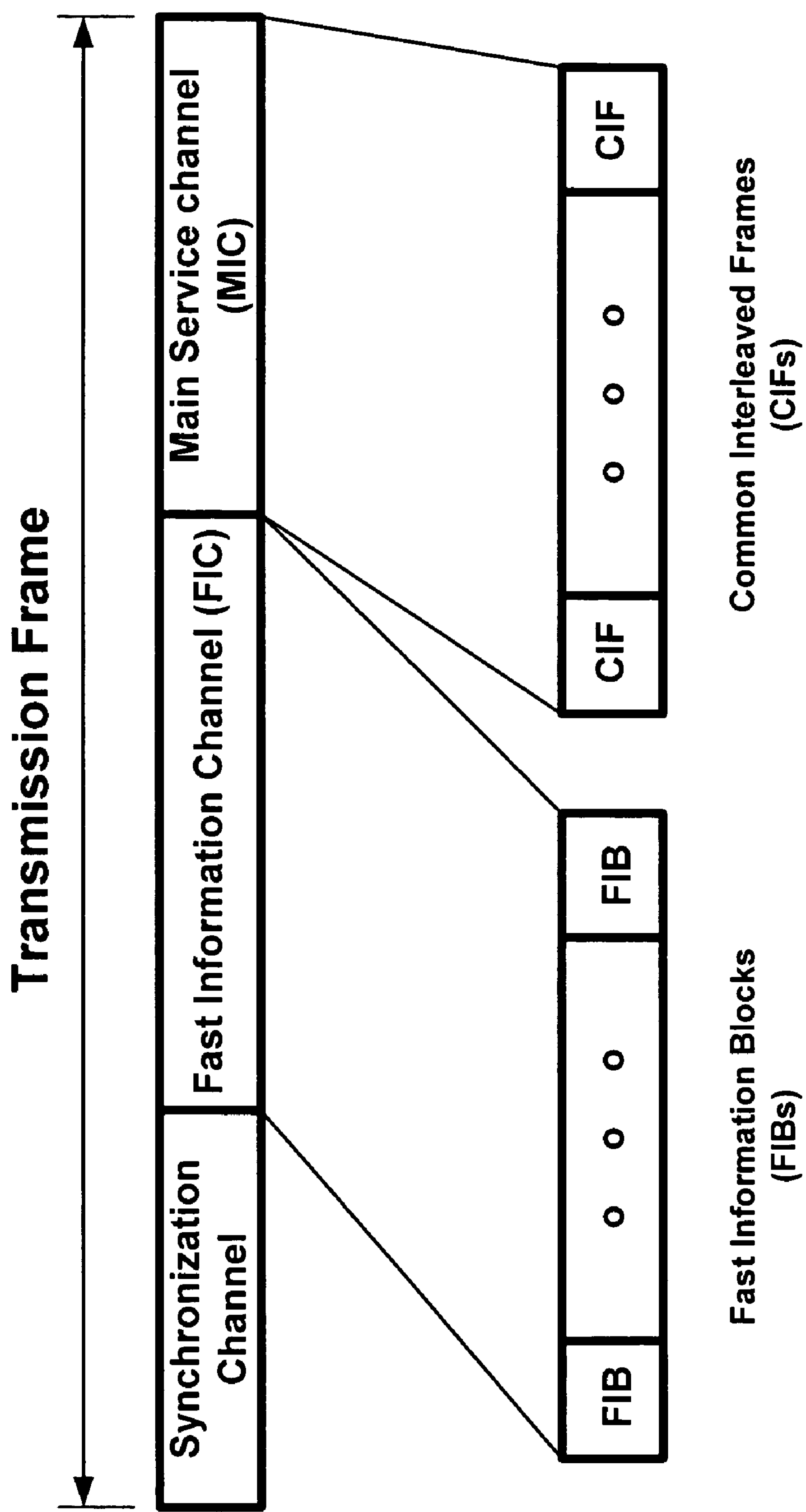
FIG. 9 shows a typical digital audio broadcast (DAB) transmission frame.

In each of these four transmission modes there is a frame consisting of three types of channels. The Main Service Channel (MSC) is used to carry audio and data service components consisting of Common Interleaved Frames (CIFs). The Fast Information Channel (FIC) is a non-time-interleaved used for rapid access of information by a receiver. This channel consists of Fast Information Blocks (FIBs). The Synchronization Channel is used for aiding the receivers' basic demodulator functions, such as transmission frame synchronization, automatic frequency control, channel state estimation, and transmitter identification. FIG. 9 shows a typical DAB transmission frame.

The Orthogonal Frequency Division Multiplex (OFDM) symbols are generated from the output of a multiplexer which combines CIFs and FIBs in a frequency interleaved symbol generator before being combined with a synchronization channel symbol generator at the OFDM signal generator.

Each transmission frame consists of consecutive OFDM symbols. The number of OFDM symbols in a transmission frame is dependent on the transmission mode. The synchronization channel in any transmission mode occupies the first two OFDM symbol in each transmission frame.

The first OFDM symbol of the transmission frame is the Null symbol of duration $T_{NULL}$. The remaining part of the transmission frame are OFDM symbols of duration $T_S$. These OFDM symbols are modulated carriers with spacing equal to $1/T_U$. Here $T_S=T_U+\Delta$ where $\Delta$ is a guard interval.

The four transmission modes have the parameter values shown in Table 2.

TABLE 2

| Parameter | Mode I | Mode II | Mode III | Mode IV |
|---|---|---|---|---|
| L | 76 | 76 | 153 | 76 |
| K | 1536 | 384 | 192 | 768 |
| $T_F$ | 196608 T (96 ms) | 49152 T (24 ms) | 49152 T (24 ms) | 98304 T (48 ms) |
| $T_{NULL}$ | 2656 T (1.297 ms) | 664 T (0.324 ms) | 345 T (0.168 ms) | 1328 T (0.648 ms) |
| $T_S$ | 2552 T (1.246 ms) | 638 T (0.312 ms) | 319 T (0.156 ms) | 1276 T (0.623 ms) |
| $T_U$ | 2048 T (1.0 ms) | 512 T (0.250 ms) | 256 T (0.125 ms) | 1024 T (0.500 ms) |
| $\Delta$ | 504 T (0.246 ms) | 126 T (0.062 ms) | 63 T (0.031 ms) | 252 T (0.123 ms) |

Here T=1/2048000 seconds=0.4883 microseconds. L is the number of OFDM symbols per transmission frame. K is the number of transmission carriers. $T_F$ is the transmission frame duration. $T_{NULL}$ is the Null symbol duration (Null symbol not included in L). $T_S$ is the duration of OFDM symbols (Null symbol is different). $T_U$ is the inverse carrier spacing. $\Delta$ is the duration of the time interval called guard interval.

The synchronization channel in any transmission mode occupies the first two OFDM symbols of each transmission frame. This consists of the null symbol and the phase reference symbol. The null symbol at the beginning of each transmission frame has the main signal equal to 0. Thus at the beginning of each transmission frame there is no signal during $T_{NULL}$ seconds.

The second OFDM symbol of the transmission frame is the phase reference symbol which sets the phase reference at the receivers for the following symbols. This phase reference symbol has duration of $T_S$ seconds. Here all the K carriers are modulated using differentially encoded Quadrature Phase Shift Keying (D-QPSK) modulation. The demodulator for this modulation uses the previous symbol as a reference for demodulation of the current symbol. Here the known phases used to modulate each of the K D-QPSK modulated carriers are fixed for each of the four transmission modes. The phase reference symbol consisting of K D-QPSK modulated carriers is a known signal component that is used by embodiments of the present invention to compute a pseudorange to the tower transmitting the DAB signal.

Figure 10:
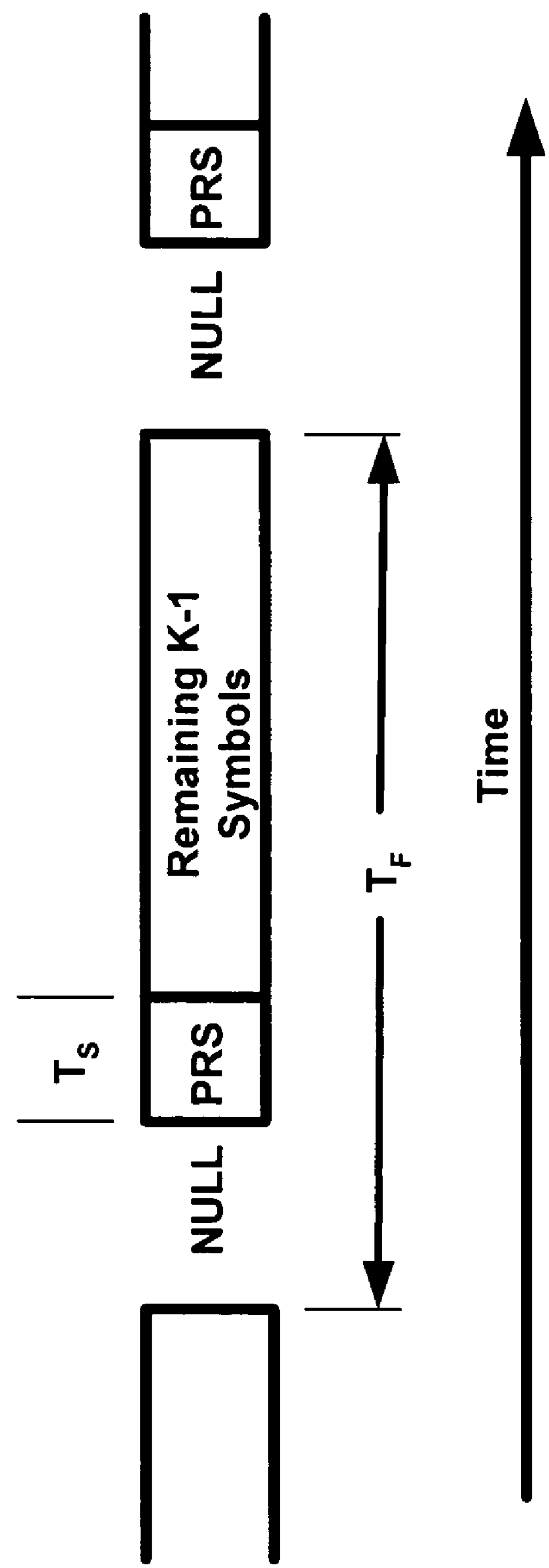
FIG. 10 shows the transmitted DAB signal as a sequence of transmission frames.

FIG. 10 shows the transmitted DAB signal as a sequence of transmission frames where there is a null symbol (no signal) followed by the known Phase Reference Symbol (PRS) which is then followed by the remaining K−1 symbols of the transmission frame.

Except for the null symbol, the normal symbols consist of K carriers modulated by D-QPSK. Embodiments of the present invention preferably use as the reference waveform the Phase Reference Symbol (PRS) of duration $T_S$ seconds located right after the first null symbol in each transmission frame. These frames occur every $T_F$ seconds. The signal parameters are summarized in Table 3.

TABLE 3

| Parameter | Mode I | Mode II | Mode III | Mode IV |
|---|---|---|---|---|
| $T_F$ | 96 ms | 24 ms | 24 ms | 48 ms |
| $T_S$ | 1.246 ms | 0.312 ms | 0.156 ms | 0.623 ms |

Thus, for example, in Mode II every 24 ms a new frame occurs with the known PRS of duration 312 microseconds at the beginning of each frame after the null symbol. Embodiments of the present invention correlate the known PRS waveform in a frame to obtain the pseudorange from user terminal 102 to the tower transmitting the DAB signal. Embodiments of the present invention also correlate with several PRS of multiple transmission frames.

Position Location Using the IBOC Signal

In the Unites States, a digital audio standard is being established which will allow for a smooth evolution from existing analog FM (88 MHz to 108 MHz) and AM (510 KHz to 1710 KHz) radio to a fully digital in-band on-channel (IBOC) system. This proposed standard, developed by iBiquity Digital Corporation, allows broadcasters to continue to transmit analog AM or FM signals simultaneously with the new, higher-quality and more robust digital signals. This approach allows the broadcasters to convert from analog to digital radio while maintaining their current frequency allocations.

The IBOC system is based on the fact that digital systems are more immune to interference than analog systems. Therefore it is easier for a digital receiver to reject the interference from an analog signal than for an analog receiver to reject a digital signal's interference. Coexistence is achieved in the IBOC system by broadcasting the digital signal at a much lower power level than the analog signal. Because of the broadcast efficiency of IBOC, a low-power signal can maintain existing coverage areas for digital receivers while allowing analog receivers to reject the interfering digital IBOC signal.

Figure 11:
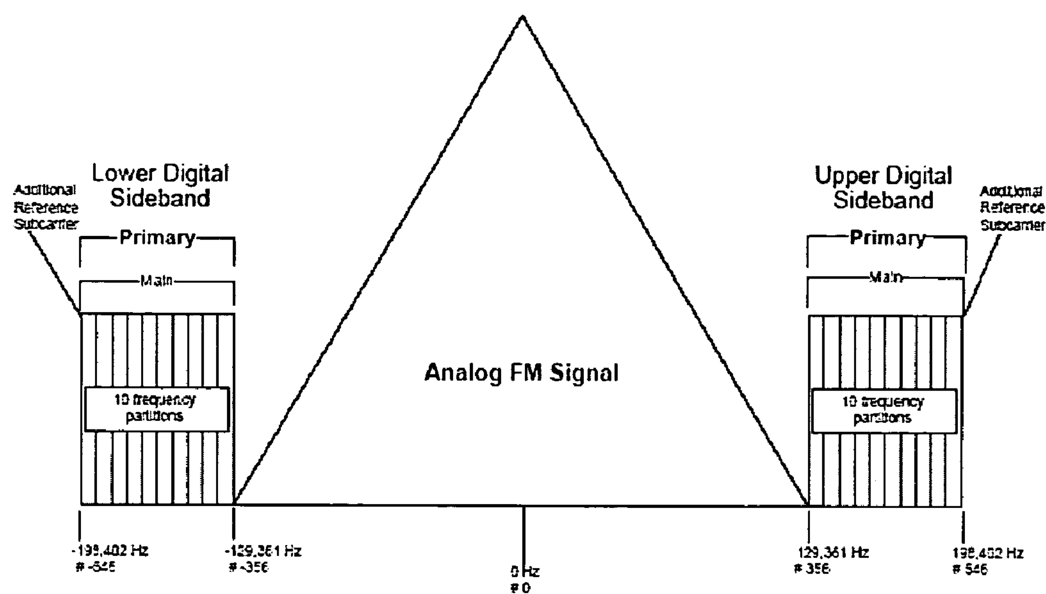
FIG. 11 shows the IBOC signal added to an existing FM signal.

Like the European DAB standard, the United States IBOC standard is based on OFDM signals. Because these IBOC signals must coexist in the same band as the analog broadcast signal, however, the distribution of the OFDM subcarriers is different from DAB. To add IBOC to an existing FM signal, 10 subcarriers are located in the lower sideband and 10 subcarriers are in the upper sideband as illustrated in FIG. 11.

Figure 12:
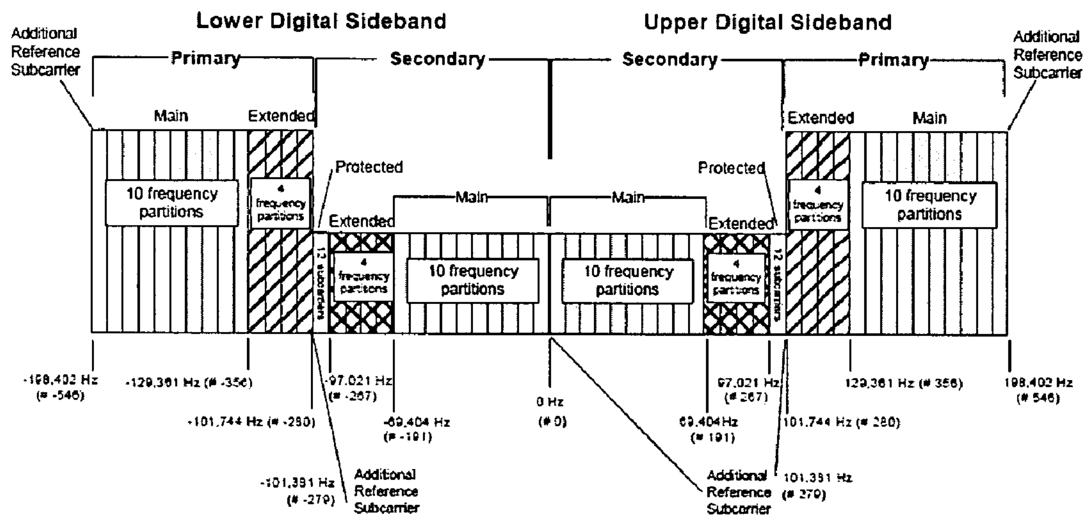
FIG. 12 shows the IBOC signal without the analog FM signal.

The IBOC signal is 25 dB below the analog FM signal. Because the digital signal power is lower, it can thus efficiently use the entire frequency mask area. Eventually when the analog FM signal is turned off, a fully digital waveform can be used as illustrated in FIG. 12.

Although the bandwidths are different, the basic structure of IBOC for AM broadcast is similar. The higher bandwidth of FM channels allows high data rates for the IBOC digital signals. IBOC data rates of 256 Kbps with coexisting FM signals are possible while with the coexisting AM signals the data rates are between 96 Kbps and 128 Kbps. The IBOC method is highly attractive because it fits within much of the existing regulatory statutes and commercial interests.

Compared to the 1.5 MHz bandwidth of the full powered DAB broadcast signals, the United States IBOC system is limited to the more narrow bandwidths of existing FM and AM broadcast channels with less than full power while it shares these channels with existing analog broadcast signals. The FM signals are less than 400 KHz while the AM signals are even more narrow in bandwidth.

As with DAB, known symbols used to help receivers synchronize to the transmitted IBOC signal are used to create a known reference waveform for IBOC signals in both the AM and FM audio bands. Embodiments of the present invention employ these reference symbols at the beginning of each frame to determine pseudo ranges by cross correlation of the received IBOC signal with the reference waveform for that signal. Thus user terminal 102 can use digital audio broadcast signals to compute pseudo ranges to these transmitters.

Figure 13:
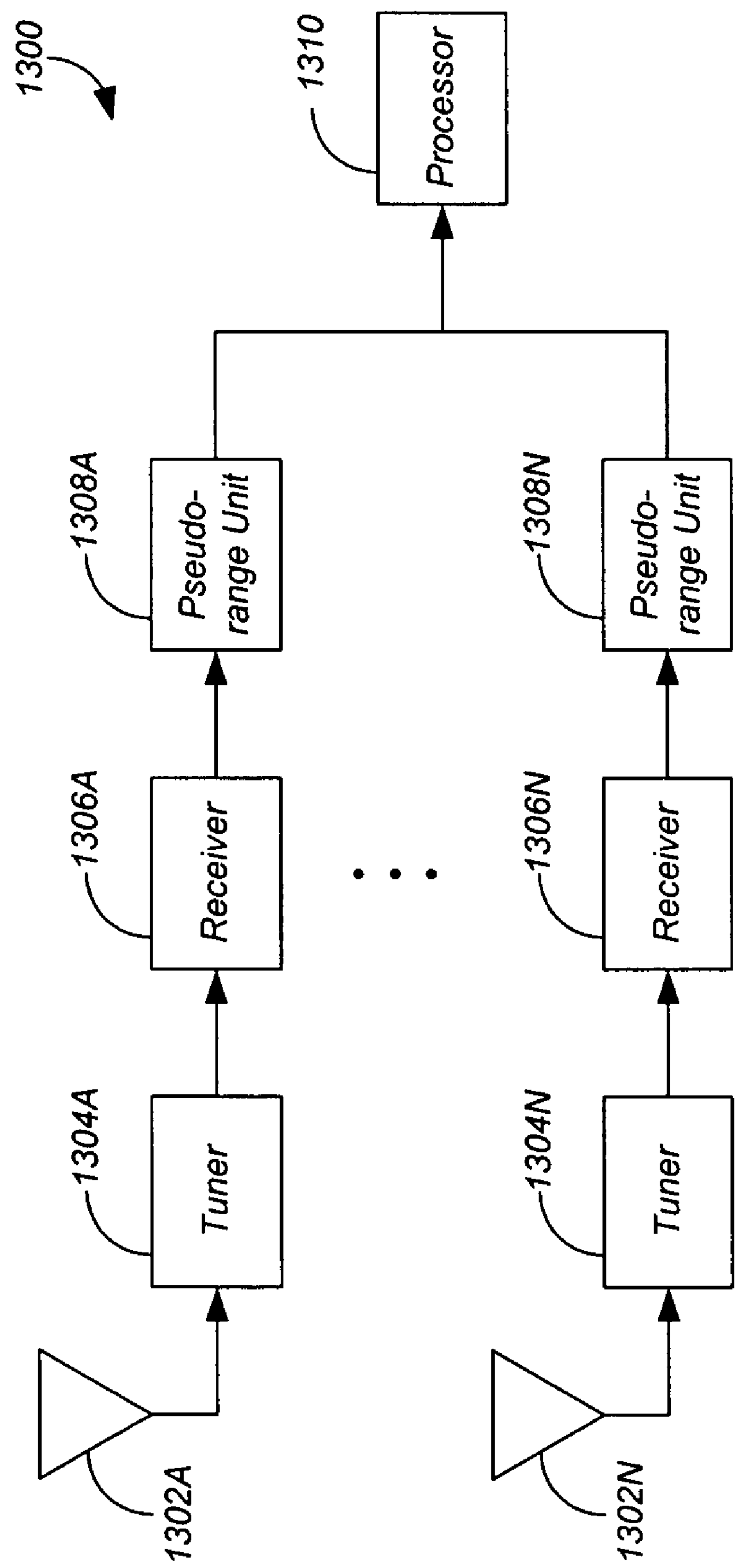
FIG. 13 shows an apparatus for determining the location of a user terminal using digital audio broadcast signals such as the DAB and IBOC signals according to a preferred embodiment.
Figure 14:
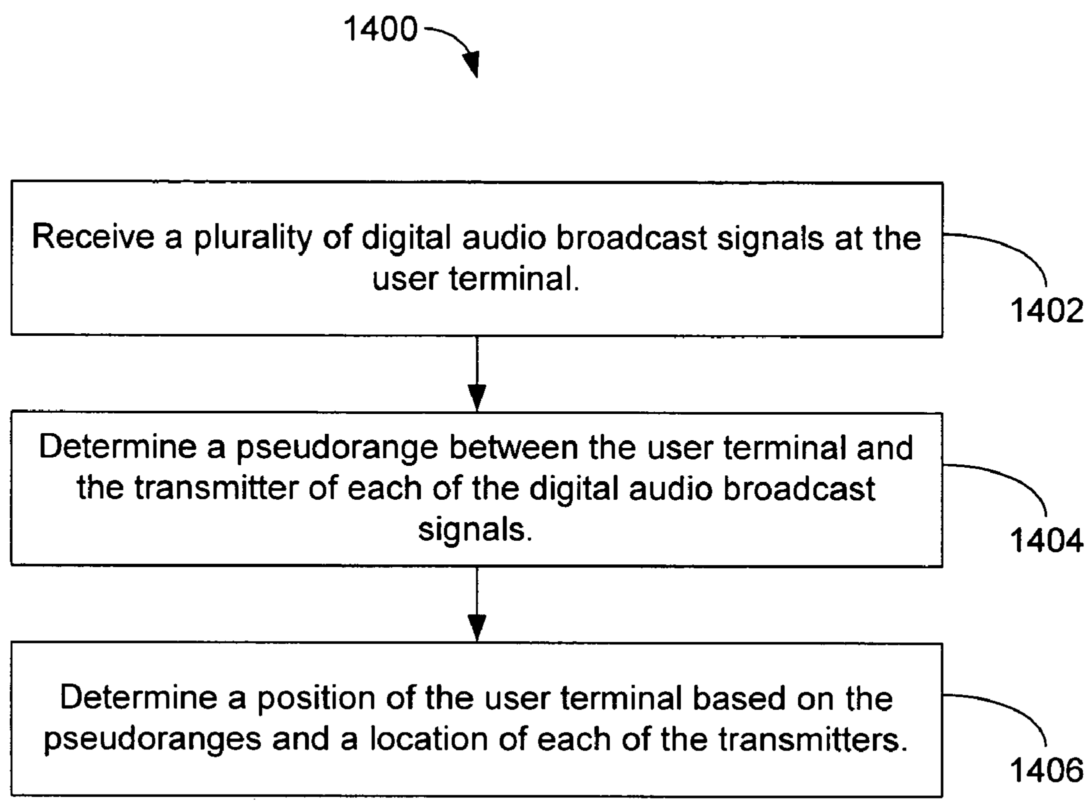
FIG. 14 shows a process for the apparatus of FIG. 13 according to a preferred embodiment.

FIG. 13 shows an apparatus 1300 for determining the location of user terminal 102 using digital audio broadcast signals such as the DAB and IBOC signals according to a preferred embodiment. FIG. 14 shows a process 1400 for apparatus 1300 according to a preferred embodiment. Each receiver 1306A through 1306N receives a different digital audio broadcast signal from respective antennas 1302A through 1302N in accordance with tuners 1304A through 1304N (step 1402). Another implementation is to use a single antenna and receiver system and tune to different digital audio broadcast signals in a time sequence. Here the apparatus for determining the location of user terminal 102 would sequentially compute the pseudo ranges of the different digital audio broadcast signals.

Each pseudorange unit 1308A through 1308N determines a pseudorange between user terminal 102 and a transmitter of the respective digital audio broadcast signal based on a known component of the respective digital audio broadcast signal (step 1404), as described above. Processor 1310 determines a position of user terminal 102 based on the pseudoranges (step 1406), as described above.

Embodiments of the present invention employ one or more digital audio broadcast signals and one or more other broadcast signals. These other broadcast signals can include broadcast television signals, mobile telephone cell site broadcast signals, and Global Positioning System signals. The broadcast television signals can include American Television Standards Committee (ATSC) digital television signals, European Telecommunications Standards Institute (ETSI) Digital Video Broadcasting-Terrestrial (DVB-T) signals, Japanese Integrated Services Digital Broadcasting-Terrestrial (ISDB-T) signals, and analog television signals.

Position location using the ATSC DTV signal is described in copending U.S. Non-provisional patent application Ser. No. 10/210,847, "Position Location using Broadcast Digital Television Signals," by James J. Spilker and Matthew Rabinowitz, filed Jul. 31, 2002, the disclosure thereof incorporated by reference herein in its entirety.

Position location using the ETSI DVB DTV signal is described in copending U.S. Non-provisional patent application Ser. No. 09/932,010, "Position Location using Terrestrial Digital Video Broadcast Television Signals," by James J. Spilker and Matthew Rabinowitz, filed Aug. 17, 2001

Position location using the Japanese ISDB-T DTV signal is described in copending U.S. Non-provisional patent application Ser. No. 10/290,984, "Wireless Position Location Using the Japanese ISDB-T Digital TV Signals," by James J. Spilker, filed Nov. 8, 2002; the disclosures thereof incorporated by reference herein in their entirety.

Position location using analog television signals is described in copending U.S. Non-provisional patent application Ser. No. 10/054,302, "Position Location using Broadcast Analog Television Signals," by James J. Spilker and Matthew Rabinowitz, filed Jan. 22, 2002; and Ser. No. 10/159,831, "Position Location Using Ghost Canceling Reference Television Signals," by James J. Spilker and Matthew Rabinowitz, filed May 31, 2002, the disclosures thereof incorporated by reference herein in their entirety.

The mobile telephone signals can include the second generation (2G) mobile phone systems such as the Global System for Mobile Communications (GSM) signals and Code-Division Multiple Access (cdmaOne) signals and the third generation (3G) mobile phone systems such as WCDMA, cdma2000, and EDGE. Position location using mobile telephone signals is described in U.S. Non-provisional patent application Ser. No. 10/232,142, "Position Location using Broadcast Television Signals and Mobile Telephone Signals," by James J. Spilker, Jimmy K. Omura and Matthew Rabinowitz, filed Aug. 29, 2002, the disclosure thereof incorporated by reference herein in its entirety.

A combined use of DTV and GPS satellite signals is described in U.S. patent application Ser. No. 10/159,478, "Position Location using Global Positioning Signals Augmented by Broadcast Television Signals," by Matthew Rabinowitz and James J. Spilker, filed May 31, 2002, the subject matter thereof incorporated herein by reference.

Figure 15:
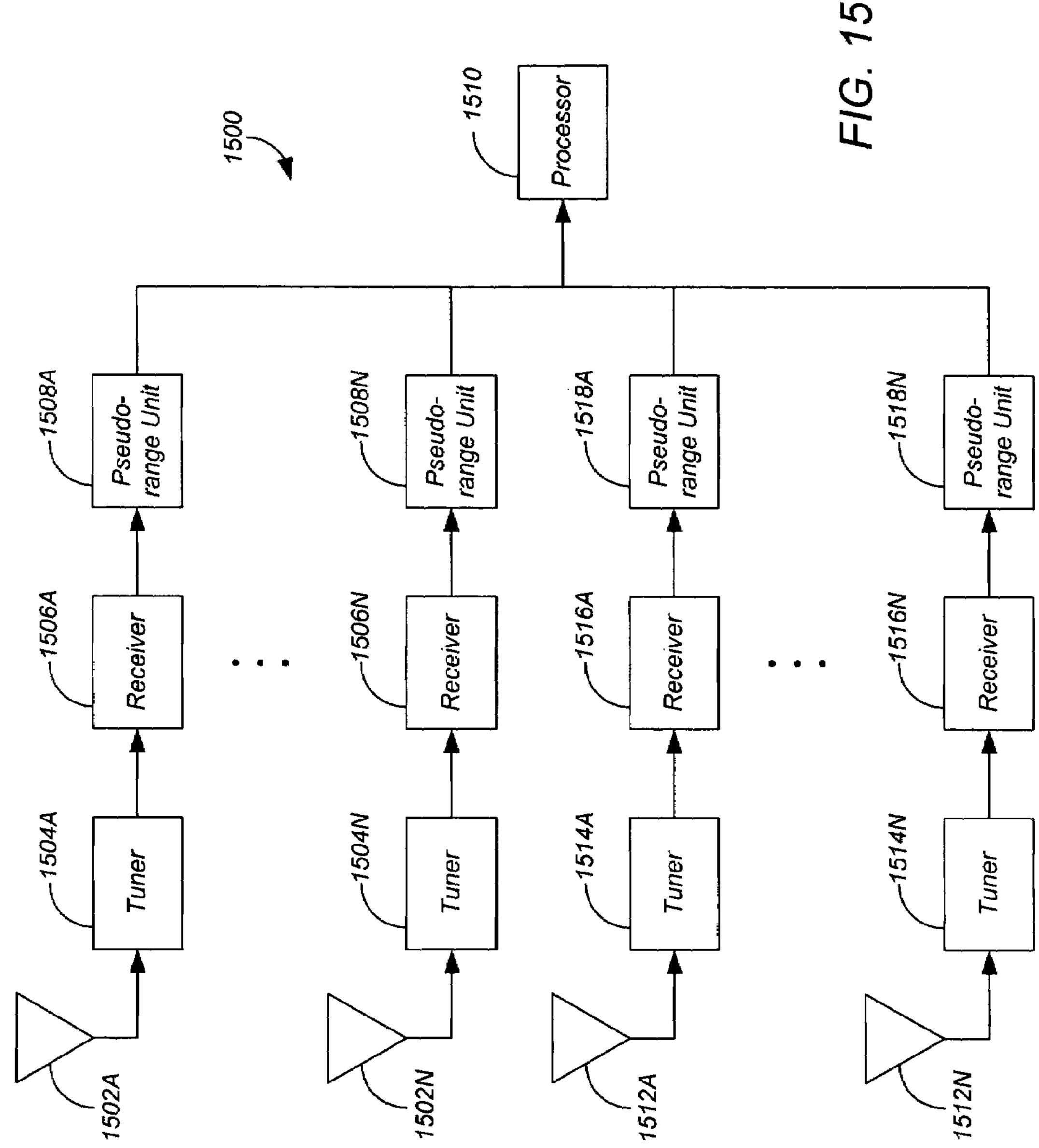
FIG. 15 shows an apparatus for determining the location of a user terminal using one or more digital audio broadcast signals such as the DAB and IBOC signals, and one or more broadcast television signals, according to a preferred embodiment.
Figure 16:
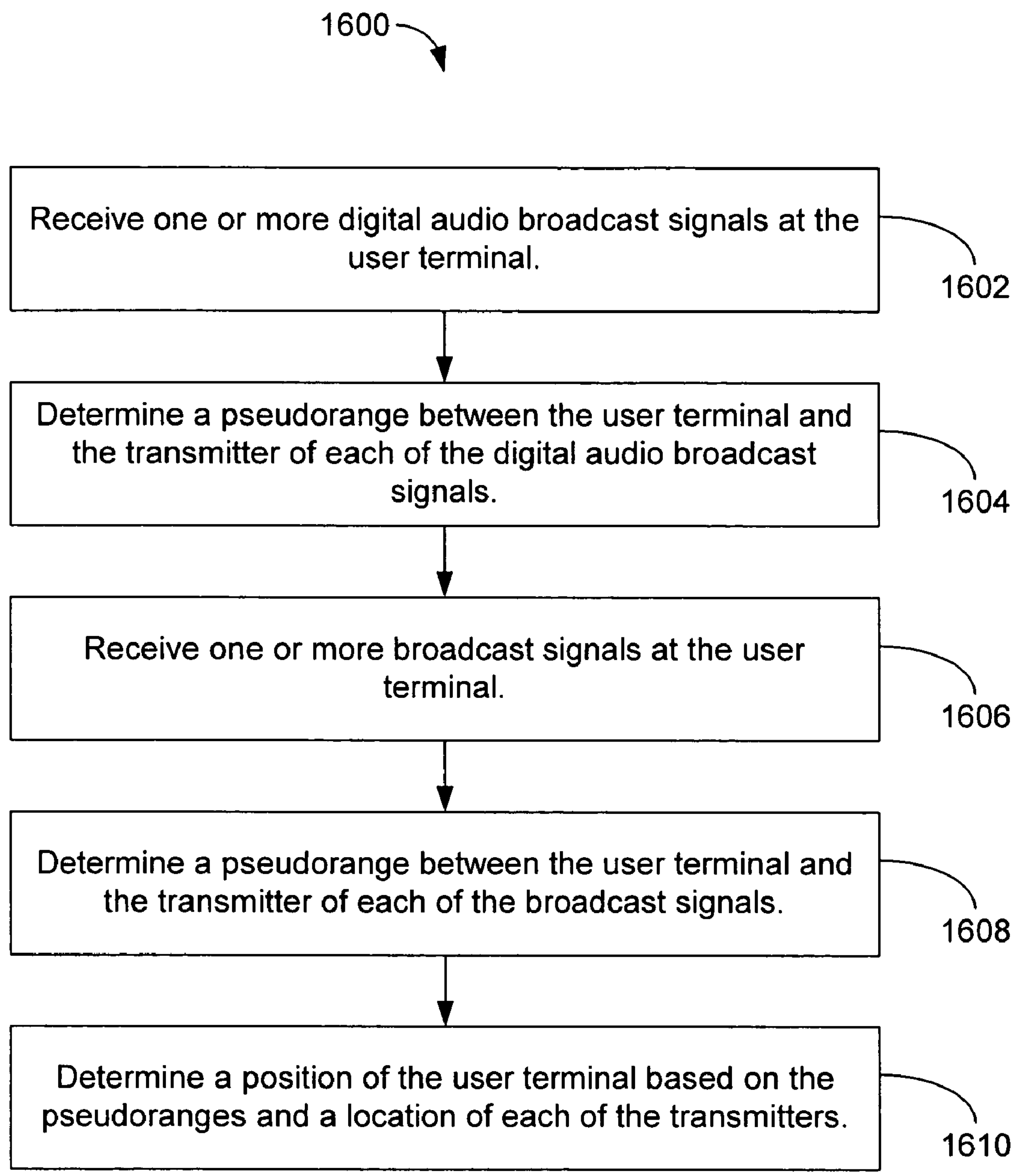
FIG. 16 shows a process for the apparatus of FIG. 15 according to a preferred embodiment.

FIG. 15 shows an apparatus 1500 for determining the location of user terminal 102 using one or more digital audio broadcast signals such as the DAB and IBOC signals, and one or more other broadcast signals, according to a preferred embodiment. FIG. 16 shows a process 1600 for apparatus 1500 according to a preferred embodiment. Each receiver 1506A through 1506N receives a different digital audio broadcast signal from respective antennas 1502A through 1502N in accordance with tuners 1504A through 1504N (step 1602). Each pseudorange unit 1508A through 1508N determines a pseudorange between user terminal 102 and a transmitter of the respective digital audio broadcast signal based on a known component of the respective digital audio broadcast signal (step 1604), as described above. Another implementation is to use a single antenna and receiver system and tune to different digital audio broadcast signals in a time sequence. Here the apparatus for determining the location of user terminal 102 would sequentially compute the pseudo ranges of the different digital audio broadcast signals.

Each receiver 1516A through 1516N receives a different broadcast signal from respective antennas 1512A through 1512N in accordance with tuners 1514A through 1514N (step 1606). Each pseudorange unit 1518A through 1518N determines a pseudorange between user terminal 102 and a transmitter of the respective broadcast signal based on a known component of the respective broadcast signal (step 1608), as described above. Processor 1510 determines a position of user terminal 102 based on the pseudoranges (step 1610), as described above.

Another embodiment of the inventions combines the digital audio broadcasting and DTV ranging signals described above with other forms of signals from which a pseudo-range can be computed. Additionally, the digital audio broadcasting signals can be combined with cellular base-station signals or digital radio signals, or any other signal that includes a synchronization code, for a combined position solution.

ALTERNATE EMBODIMENTS

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

Implementations of the present invention exploit the fact that the DTV signal has high power, and can still be tracked by capturing bursts of signal or using a low-duty-factor reference signal which does not use all of the incident signal energy. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18–6. Other implementations employ other variations of the DLL, including coherent, non-coherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as pseudo-ranges available from the DTV transmitters, making additional checks to validate each DTV channel and pseudo-range, and to identify pseudo-ranges of DTV channels that are erroneous. One such technique is conventional receiver autonomous integrity monitoring (RAIM).

Accordingly, other embodiments are within the scope of the following claims.

What is claimed is:

1. An apparatus for determining the position of a user terminal, comprising:

a receiver adapted to receive, at the user terminal, a digital audio broadcast signal; and a pseudo-range unit adapted to determine a pseudo-range between the user terminal and a transmitter of the digital audio broadcast signal based on a known component of the digital audio broadcast signal;

wherein the position of the user terminal is determined based on the pseudo-range between the user terminal and the transmitter of the digital audio broadcast signal and a location of the transmitter of the digital audio broadcast signal.

2. The apparatus of claim 1, further comprising:

a processor adapted to determine the position of the user terminal based on the pseudo-range between the user terminal and the transmitter of the digital audio broadcast signal and a location of the transmitter of the digital audio broadcast signal.

3. The apparatus of claim 1, wherein the digital audio broadcast signal is selected from the group consisting of:

a European Telecommunications Standards Institute (ETSI) Digital Audio Broadcast (DAB) signal; and an In-Band On-Channel (IBOC) audio broadcast signal.

4. The apparatus of claim 3, wherein the known component of the digital audio broadcast signal is selected from the group consisting of:

a synchronization symbol;

a null symbol in a synchronization channel; and a phase reference symbol in a synchronization channel.

5. The apparatus of claim 1, further comprising:

a further receiver adapted to receive, at the user terminal, a broadcast signal; and a further pseudo-range unit adapted to determine a pseudo-range between the user terminal and a transmitter of the broadcast signal based on a known component of the broadcast signal;

wherein the position of the user terminal is determined based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal.

6. The apparatus of claim 5, wherein the broadcast signal is selected from the group consisting of:

a broadcast television signal;

a mobile telephone cell site broadcast signal; and a Global Positioning System signal.

7. An apparatus for determining the position of a user terminal, comprising:

receiver means for receiving, at the user terminal, a digital audio broadcast signal; and pseudo-range unit means for determining a pseudo-range between the user terminal and a transmitter of the digital audio broadcast signal based on a known component of the digital audio broadcast signal;

wherein the position of the user terminal is determined based on the pseudo-range between the user terminal and the transmitter of the digital audio broadcast signal and a location of the transmitter of the digital audio broadcast signal.

8. The apparatus of claim 7, further comprising:

processor means for determining the position of the user terminal based on the pseudo-range between the user terminal and the transmitter of the digital audio broadcast signal and a location of the transmitter of the digital audio broadcast signal.

9. The apparatus of claim 7, wherein the digital audio broadcast signal is selected from the group consisting of:

a European Telecommunications Standards Institute (ETSI) Digital Audio Broadcast (DAB) signal; and an In-Band On-Channel (IBOC) audio broadcast signal.

10. The apparatus of claim 9, wherein the known component of the digital audio broadcast signal is selected from the group consisting of:

a synchronization symbol;

a null symbol in a synchronization channel; and a phase reference symbol in a synchronization channel.

11. The apparatus of claim 7, further comprising:

further receiver means for receiving, at the user terminal, a broadcast signal; and further pseudo-range unit means for determining a pseudo-range between the user terminal and a transmitter of the broadcast signal based on a known component of the broadcast signal;

wherein the position of the user terminal is determined based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal.

12. The apparatus of claim 11, wherein the broadcast signal is selected from the group consisting of:

a broadcast television signal;

a mobile telephone cell site broadcast signal; and a Global Positioning System signal.

13. A method for determining the position of a user terminal, comprising:

receiving, at the user terminal, a digital audio broadcast signal; and determining a pseudo-range between the user terminal and a transmitter of the digital audio broadcast signal based on a known component of the digital audio broadcast signal;

wherein the position of the user terminal is determined based on the pseudo-range between the user terminal and the transmitter of the digital audio broadcast signal and a location of the transmitter of the digital audio broadcast signal.

14. The method of claim 13, further comprising:

determining the position of the user terminal based on the pseudo-range between the user terminal and the transmitter of the digital audio broadcast signal and a location of the transmitter of the digital audio broadcast signal.

15. The method of claim 13, wherein the digital audio broadcast signal is selected from the group consisting of:

a European Telecommunications Standards Institute (ETSI) Digital Audio Broadcast (DAB) signal; and an In-Band On-Channel (IBOC) audio broadcast signal.

16. The method of claim 15, wherein the known component of the digital audio broadcast signal is selected from the group consisting of:

a synchronization symbol;

a null symbol in a synchronization channel; and a phase reference symbol in a synchronization channel.

17. The method of claim 13, further comprising:

receiving, at the user terminal, a broadcast signal; and determining a pseudo-range between the user terminal and a transmitter of the broadcast signal based on a known component of the broadcast signal;

wherein the position of the user terminal is determined based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal.

18. The method of claim 17, wherein the broadcast signal is selected from the group consisting of:

a broadcast television signal;

a mobile telephone cell site broadcast signal; and a Global Positioning System signal.

19. Computer-readable media embodying instructions executable by a computer to perform a method for determining the position of a user terminal, the method comprising:

determining a pseudo-range between the user terminal and a transmitter of a digital audio broadcast signal received at the user terminal based on a known component of the digital audio broadcast signal; and wherein the position of the user terminal is determined based on the pseudo-range between the user terminal and the transmitter of the digital audio broadcast signal and a location of the transmitter of the digital audio broadcast signal.

20. The media of claim 19, wherein the method further comprises:

determining the position of the user terminal based on the pseudo-range between the user terminal and the transmitter of the digital audio broadcast signal and a location of the transmitter of the digital audio broadcast signal.

21. The media of claim 19, wherein the digital audio broadcast signal is selected from the group consisting of:

a European Telecommunications Standards Institute (ETSI) Digital Audio Broadcast (DAB) signal; and an In-Band On-Channel (IBOC) audio broadcast signal.

22. The media of claim 21, wherein the known component of the digital audio broadcast signal is selected from the group consisting of:

a synchronization symbol;

a null symbol in a synchronization channel; and a phase reference symbol in a synchronization channel.

23. The media of claim 19, wherein the method further comprises:

determining a pseudo-range between the user terminal and a transmitter of a broadcast signal received at the user terminal based on a known component of the broadcast signal;

wherein the position of the user terminal is determined based on the pseudo-range between the user terminal and the transmitter of the digital audio broadcast signal, the pseudo-range between the user terminal and the transmitter of the broadcast signal, a location of the transmitter of the digital audio broadcast signal, and a location of the transmitter of the broadcast signal.

24. The media of claim 23, wherein the broadcast signal is selected from the group consisting of:

a broadcast television signal;

a mobile telephone cell site broadcast signal; and a Global Positioning System signal.

* * * * *

UNITED STATES PATENT AND TRADEMARK OFFICE

CERTIFICATE OF CORRECTION

PATENT NO. : 7,042,396 B2
APPLICATION NO. : 10/741431
DATED : May 9, 2006
INVENTOR(S) : Onyra et al.

It is certified that error appears in the above-identified patent and that said Letters Patent is hereby corrected as shown below:

ON THE TITLE PAGE ITEM (73) PLEASE DELETE "ROSOM" AND INSERT --ROSUM--

Signed and Sealed this

Twenty-third Day of October, 2007

JON W. DUDAS
*Director of the United States Patent and Trademark Office*